United States Patent
Miyamoto et al.

[11] Patent Number: 6,147,733
[45] Date of Patent: Nov. 14, 2000

[54] DIFFUSING FILM AND LIQUID CRYSTAL DISPLAY ELEMENT EMPLOYING THE SAME

[75] Inventors: Tsuyoshi Miyamoto; Asa Kimura, both of Kanagawa, Japan

[73] Assignee: Shiseido Co., Ltd., Tokyo, Japan

[21] Appl. No.: 09/043,453

[22] PCT Filed: Jul. 25, 1997

[86] PCT No.: PCT/JP97/02582

§ 371 Date: May 27, 1998

§ 102(e) Date: May 27, 1998

[87] PCT Pub. No.: WO98/04936

PCT Pub. Date: Feb. 5, 1998

[30] Foreign Application Priority Data

| Jul. 26, 1996 | [JP] | Japan | 8-215523 |
| Mar. 31, 1997 | [JP] | Japan | 9-098528 |
| Mar. 31, 1997 | [JP] | Japan | 9-098529 |
| Mar. 31, 1997 | [JP] | Japan | 9-098532 |

[51] Int. Cl.[7] .............................................. G02F 1/1335
[52] U.S. Cl. ........................ 349/112; 349/115; 359/599
[58] Field of Search ................... 349/112, 113, 349/115; 359/599

[56] References Cited

FOREIGN PATENT DOCUMENTS

| 0 668 513 A1 | 8/1995 | European Pat. Off. |
| 0 719 843 A1 | 7/1996 | European Pat. Off. |
| 55-84975 | 6/1980 | Japan |
| 57-88401 | 6/1982 | Japan |
| 60-247621 | 12/1985 | Japan |
| 60-250304 | 12/1985 | Japan |
| 60-250382 | 12/1985 | Japan |
| 7-326224 | 12/1995 | Japan |
| 8-179125 | 7/1996 | Japan |

Primary Examiner—William L. Sikes
Assistant Examiner—Toan Ton
Attorney, Agent, or Firm—Snider & Associates; Ronald R. Snider

[57] ABSTRACT

This invention is to provide a diffusing film, a lighting unit, and a liquid crystal display element which can efficiently uses a light from a light source and which can obtain a beautiful image.

A diffusing film comprising a powder which diffuses an incident light and which has an interference color of the same wave range with an absorption wave range, in uniformly and a diffusing film comprising two or more of a powder whose interference colors are complementary to each other, and a liquid crystal display element using the same.

12 Claims, 22 Drawing Sheets

Fig. 6
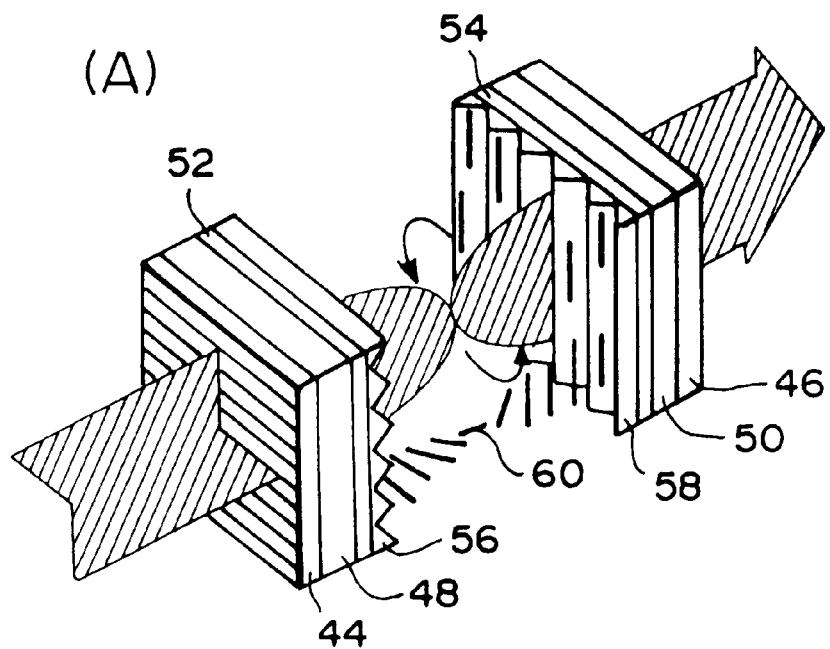
(A)
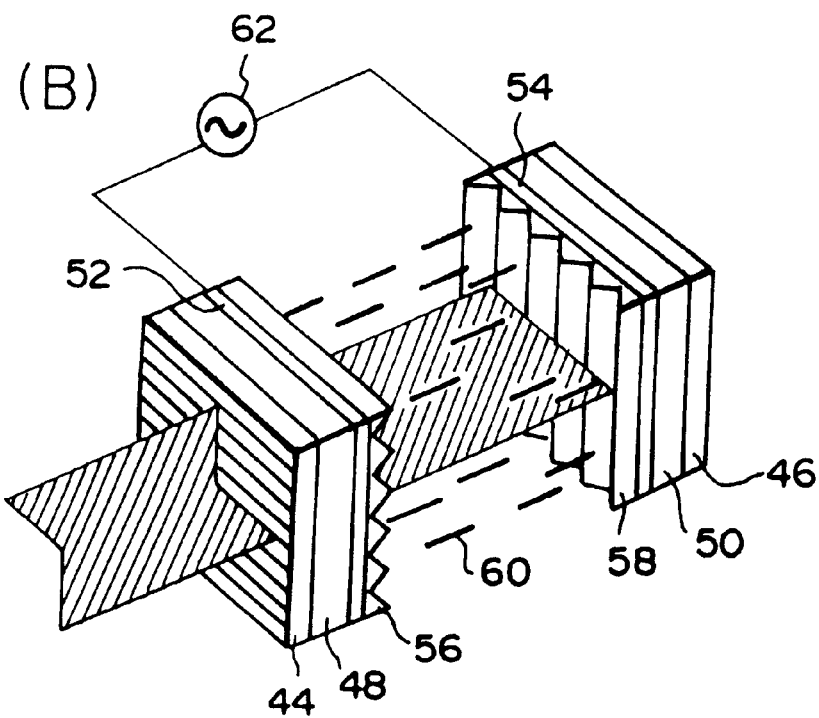
(B)

1

DIFFUSING FILM AND LIQUID CRYSTAL DISPLAY ELEMENT EMPLOYING THE SAME

This application claims the priority of Japanese Patent Application No. Heisei 8-215523, filed Jul. 26, 1996, Japanese Patent Application No. Heisei 9-98528, filed Mar. 31, 1997, Japanese Patent Application No. Heisei 9-98529, filed Mar. 31, 1997, and Japanese Patent Application No. Heisei 9-98532, filed Mar. 31, 1997 which are incorporated herein by reference.

TECHNICAL FIELD

The present invention relates to a diffusing film and a liquid crystal display element, and in particular, relates to an improvement of its color tone.

BACKGROUND ART

In recent years, a liquid crystal display element is used in various fields, and in particular, is largely used in a field of electronic industries such as a notebook personal computer, portable liquid crystal television, and the like, since the liquid crystal display element is thin-type and lightweight. This liquid crystal display element indicates image by controlling light transmission/shielding from an external light or back lighting (internal light source) by means of a liquid crystal shutter, since the liquid crystal display element does not emit light in itself unlike a plasma display. Namely, in a liquid crystal display element, a diffusing film, which is to provide a light in uniformly to an entire liquid crystal panel, is inserted into the backside of a liquid crystal panel in general. A reflective film that has high diffused reflectance is used in the liquid crystal display which uses an external light. The reflective film scatters and reflects the external light which is entered from the obverse side of the liquid crystal panel and returns to the liquid crystal panel. The display indicates image by controlling transmission/shielding by means of a liquid crystal shutter. While a diffusing film that has high diffused transmittance is used in the liquid crystal display which uses a back lighting. The diffusing film diffuses and transmits the internal light from the reverse side of a liquid crystal panel and provides a light to the liquid crystal panel. Transmission/shielding of light is controlled by means of the liquid crystal shutter. Further, a semitransmissive diffusing film which properly uses the external light and the back lighting according to ON/OFF of the back lighting, also can be used.

Conventionally, as for a technique regarding a transmissive diffusing film which diffuses a light flux from a back lighting, the technique mentioned in Japanese Unexamined Patent Publication No. Sho 57-88401 is known. Also, as for a technique for complementing a color tone, the technique mentioned in Japanese Unexamined Patent Publication No. Sho 60- 250382 is known.

A transmissive diffusing film mentioned in said Japanese Unexamined Patent Publication No. Sho 57-88401 comprises one pearly pigment and diffuses a light flux from a back lighting by this pearly pigment.

On the other hand, in addition to said pearly pigment, a polarizer disclosed in said Japanese Unexamined Patent Publication No. Sho 60-250382 further comprises fluorescent dye, blue dye and the like. A color tone is obtained by absorbing an optical component which has a specific wavelength among a light flux from the back lighting, to dye.

However, the light transmittance in the case where white light was entered, was low in short wave range as compared with long wave range, in the diffusing film mentioned in said Japanese Unexamined Patent Publication No. Sho 57-88401, as shown in FIG. 1a. Therefore, a color tone of a transmitted light in a diffusing film became dark liver brown and satisfactory color tone and lightness could not be obtained even when this diffusing film was used for a liquid crystal display element.

Also, a polarizing film mentioned in said Japanese Unexamined Patent Publication No. Sho 60-250382 is exemplified as for a technique to complement an inferiority of color tone. However, an incident light from a back lighting was not effectively used since an optical component which has a specific wavelength among the incident light from the back lighting was absorbed by dye. Accordingly, satisfactory color tone and brightness could not be obtained even in the case where these dyes were used in the diffusing film. Also, in view of the stability of color tone, satisfactory diffusing film were not obtained because dyes were easily deteriorated by light.

A semitransmissive liquid crystal display element which uses an external light or an internal light according to well-lighted time or darkened time, spent lower power than a transmissive liquid crystal display element which continuously uses a light flux from an internal light source.

A semitransmissive liquid crystal display element needs to have light transmittance that a semitransmissive diffusing film which was located between a liquid crystal panel and an internal light source, uniformly diffuses a light flux from the internal light source when the internal light source was switched ON and light reflectance that the semitransmissive diffusing film uniformly diffuses the light flux entered from an external portion to the liquid crystal display element and reflects again to an external direction when the internal light source was switched OFF.

As for a technique to obtain a transmitted light and a reflected light by white light in the case where white light is entered to a semitransmissive diffusing film, the technique mentioned in Japanese Unexamined Patent Publication No. Hei 8-179125 is exemplified.

A semitransmissive diffusing film mentioned in said Japanese Unexamined Patent Publication No. Hei 8-179125 uses one white pearly pigment in a substrate. Namely, white transmitted and reflected light in the semitransmissive diffusing film are obtained by whitening the pearly pigment in itself.

However, in the case where white light was entered to the semitransmissive diffusing film mentioned in said Japanese Unexamined Patent Publication No. Hei 8-179125, for example, the transmitted light became dark liver brown, since light transmittance in the semitransmissive diffusing film was low, as like the transmissive diffusing film, in short wave range as compared with long wave range as shown in FIG. 1. Therefore, satisfactory color tone and brightness could not be obtained.

Accordingly, though this semitransmissive diffusing film was used in a lighting unit or semitransmissive liquid crystal display element, satisfactory color tone and brightness were not obtained nevertheless.

Further, the more labor-saving power is required in the case where a liquid crystal display element is used as portable type or on-vehicle type liquid crystal display element. In particular, downsizing and lightening of a portable apparatus becomes necessary with rapid spread of portable use such as a portable telephone, a personal digital assistants (PDA), and the like. Therefore, a reflective liquid crystal display element which uses an external light without using a lighting unit (back lighting unit) which occupies a large part of electricity consumption, is expected.

A conventional reflective liquid crystal display element was a black-white display. A metal deposited film, a polishing metal plate, and the like which has metallic luster were used as a reflective film. Also, a semitransmissive diffusing film mentioned in Japanese Unexamined Patent Publication No. Hei 8-179125 which has the same reflectivity as a reflective film in spite of a semitransmissive diffusing film, was exemplified.

However, said conventional reflective film which has metallic luster sometimes caused a so-called greasiness that luminance was extremely decreased excluding a specular reflection angle, though said reflective film had high specular reflection luminance. In the case where this reflective film was used in a liquid crystal display element, visibility was sometimes spoiled.

Also, a semitransmissive diffusing film disclosed in said Japanese Unexamined Patent Publication No. Hei 8-179125 uses one white pearly pigment in a substrate. Namely, white reflected light in the semitransmissive diffusing film was obtained by whitening the pearly pigment in itself.

However, when white light was entered to a reflective film in the case where one of this white pearly pigment was used in a reflective film, there was a fear that the light reflectance at the reflective film became low in long wave range in comparison with in short wave range. Accordingly, satisfactory color tone and brightness were not obtained even when these reflective films were used in the reflective liquid crystal display element.

DISCLOSURE OF INVENTION

In view of the foregoing problems of the prior art, an object of the present invention is to provide a diffusing film and a liquid crystal display which can efficiently use a light from a light source and which can obtain beautiful image.

To attain the above-mentioned object, a diffusing film of the present invention comprising a powder which diffuses an incident light and which has an interference light of the same wave range with an absorption wave range of the incident light, in uniformly.

Also, in said diffusing film, it is preferable to comprise two or more of powder that each interference color is in a complementary relation.

Also, in said diffusing film, it is preferable to add 10% to 90% of a powder whose interference color is in a complementary relation with respect to the other powder so as to obtain white transmitted light in the diffusing film.

Also, in said diffusing film, it is preferable that said powder is a pearly pigment.

Also, in said diffusing film, it is preferable that said powder is titanium dioxide coated mica which is coated titanium dioxide on the surface of mica, and the layer thickness of titanium dioxide which is coated on the surface of mica is the layer thickness that an interference color of the same wave range with an absorption wave range of said titanium dioxide coated mica can be obtained.

Also, in said diffusing film, it is preferable that said powder is titanium dioxide coated synthetic mica which is coated titanium dioxide on the surface of synthetic mica.

Also, in said diffusing film, it is preferable that an amount of said powder is 0.01 g/m$^2$ to 100 g/m$^2$ in the case where said powder is set on a substrate.

Also, in said diffusing film, it is preferable that an amount of said powder is 1 wt % to 70 wt % in the case where said powder is set in a substrate.

Also, a liquid crystal display element in the present invention comprising a diffusing film which diffuses a light and which uniformly comprises a powder that an interference light of the same wave range with an absorption wave range of the light and a liquid crystal panel which controls light transmittance of a light flux from said diffusing film by changing a voltage which applies onto a liquid crystal layer.

Also, in said liquid crystal display element, it is preferable that said diffusing film comprises two or more of a powder whose interference colors are complementary to each other.

Also, in said liquid crystal display element, it is preferable that said diffusing film is a semitransmissive diffusing film and uses a powder which can generate a colored interference light. Also it is preferable that said diffusing film tone a color tone at transmissive and reflective mode.

Also, said semitransmissive liquid crystal display element comprising: an internal light source which irradiates a light flux in the case where the internal light source is switched ON and which stops an irradiation of the light flux in the case where the internal light source is switched OFF; a semitransmissive diffusing film which transmits the light flux from said internal light source in the case where said light internal light source is switched ON and which reflects an external light from a reverse side of said internal light source in the case where said internal light is switched OFF; and a liquid crystal panel which controls light transmittance of said light flux by changing a voltage which applies onto a liquid crystal layer, wherein said semitransmissive diffusing film comprises a powder which has a colored interference color.

A liquid crystal panel mentioned in here will be explained. For example, vibration direction of a light flux was changed with the change of the orientation of liquid crystal molecular, when a voltage was applied onto a liquid crystal layer which was held between two alignment film. Among the light flux passed the latter alignment film, an polarizing film which passed linearly polarized light of the prescribed vibration direction. The liquid crystal panel can control light transmittance by changing a voltage which applies onto a liquid crystal layer.

BRIEF DESCRIPTION OF DRAWINGS

FIG. 6 is an explanatory view of display mechanism of the liquid crystal display element shown in said FIG. 5.

BEST MODE FOR CARRYING OUT THE INVENTION

As described above, a powder which has an interference light whose wave range is the same with an absorption wave range is used uniformly in a diffusing film in accordance with the present invention. Therefore, a diffused light at the diffusing film can be obtained as white interference light in the case where white light enters into diffusing film, because an optical component which has specific wave range to be absorbed by the powder and the like, can be favorably complemented by the interference color of the powder.

Also, in the diffusing film of the present invention, two or more powders that have interference colors in a complementary relation were used in the place of said powder. Therefore, a diffused light at the diffusing film can be obtained with more white interference light, since the interference color of these powders can be favorably blended.

Also in said reflective diffusing film, a diffused light at the diffusing film can be obtained with satisfactory white interference light by adding 10% to 90% of the powder whose interference color is in a complementary relation, with respect to the other powder.

Also, a transmitted light at the diffusing film can be obtained with more white interference light in the case where said powder is titanium dioxide coated mica which is coated titanium dioxide on the surface of mica and a layer thickness of titanium dioxide which is coated on the surface of mica is determined as the layer thickness which can obtain an interference color whose wave range is the same with an optical component which has specific wavelength absorbed by this titanium dioxide coated mica.

Also, it is preferable that an amount of said powder is 0.01 $g/m^2$ to 100 $g/m^2$ in the case where said powder is set on a substrate. On the other hand, it is preferable that an amount of said powder is 1 wt % to 70 wt % in the case where said powder is set in a substrate. Namely, light diffusibility and light transmittance or reflectance of the diffusing film can be favorably controlled by determining the percentage of said powder.

According to the liquid crystal display element in accordance with the present invention, beautiful image can be obtained because a light from a light source can be efficiently used by using a diffusing film of the present invention in a lighting unit and a liquid crystal display element.

Figure 3:
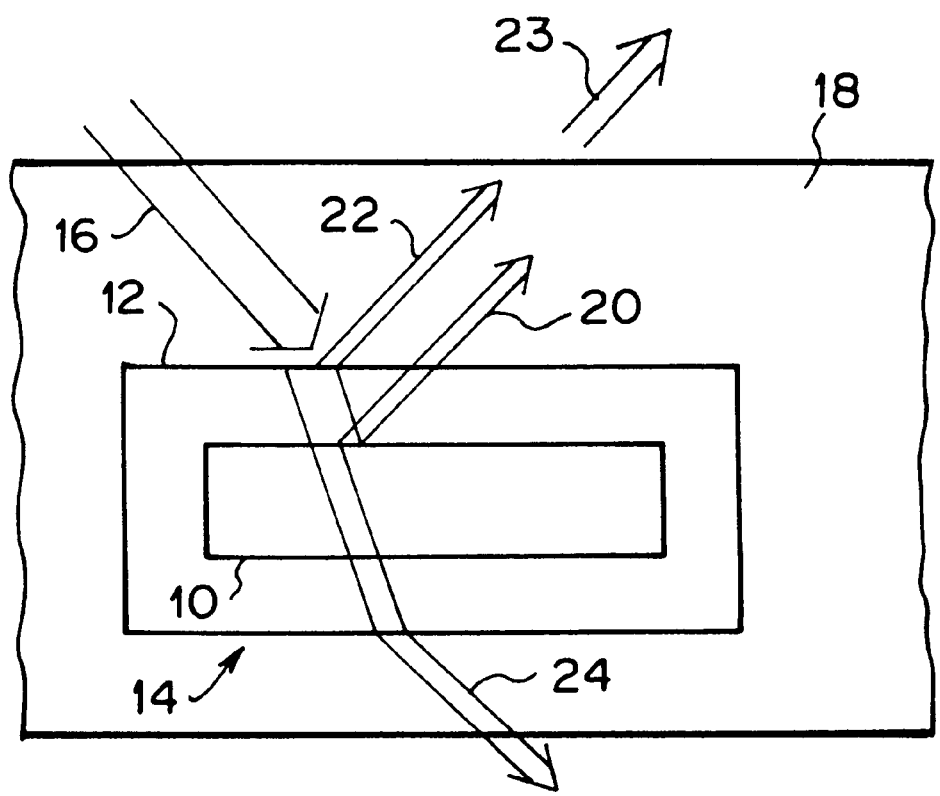
FIG. 3 is an explanatory view of a powder which is used in a diffusing film of the present invention.

First, a powder which is characteristic in the present invention and has an interference light of the same wavelength with an optical component which has a specific wavelength absorbed by the powder is typified as shown in FIG. 3.

In FIG. 3, mica 10 is scaly and titanium dioxide 12 is coated onto mica and is surrounding mica in a thin-layer state.

Such titanium dioxide coated mica 14 (powder) has an interference color of various color tones.

In the case where titanium dioxide coated mica 14 receives white light 16, one part of the light is reflected on the boundary of a substrate 18-titanium dioxide 12 and on the boundary of titanium dioxide 12-mica 10.

As a result, a light which have some wavelength was not observed in appearance and a light which have other wavelength is amplified, in the case where a reflected light 20 and 22 were observed. Namely, in view of optical path difference L (=almost twice of the layer thickness of titanium dioxide), the top portion of the optical component of the reflected light 22 is located on the bottom portion of the optical component of the reflected light 20 in the optical component which has the wavelength of the reflected light 22 as shown in FIG. 4(A) and the optical component which has the wavelength of the reflected light 20. So, both optical components are weaken each other and are externally disappeared as shown in FIG. 4(C). However, in the case where the optical component is half wave of FIG. 4(A) as shown in FIG. 4(D), each of the optical component of the reflected light 20 and 22 shift for one wavelength. Both the top portion and the bottom portion overlap each other and the amplitude is amplified as shown in FIG. 4(F).

For example, in the case where a reflected interference light 23 generated by the reflected light 20 and 22, an interference color of various colors such as red, violet, blue, green, and the like can be obtained by changing the layer thickness of titanium dioxide 12.

On the other hand, a part of white light 16 (incident light) became a transmitted light 24, since the light transmittance of titanium dioxide 12 and mica 10 were high in the case where titanium dioxide coated mica 14 was used. This transmitted light 24 was in a complementary relation with said reflected interference light 23.

Accordingly, the transmitted light 24 can be obtained in various interference colors such as green, pale yellow, yellow, red, and the like.

In this embodiment, optical layer thickness of titanium dioxide 12 was constructed so as to obtain the interference light 23 which has the same wavelength with the optical component which has specific wavelength absorbed by titanium dioxide coated mica 14. Therefore, the color tone absorbed by titanium dioxide coated mica 14 can be complemented by the interference color of the titanium dioxide coated mica 14.

For example, in the case where titanium dioxide coated mica 14 of this embodiment absorbs blue optical component, the layer thickness of titanium dioxide 12 which is coated on the surface of mica 14 is determined so as to obtain blue interference color. Also, the layer thickness of titanium dioxide is determined so as that the transmitted light at the diffusing film can be obtained white interference color as a whole in the case where white light enters the diffusing film.

As for the powder of this embodiment which is typified by titanium dioxide coated mica 14, titanium dioxide coated mica that titanium dioxide was coated on scaly mica, fish scale guanine, basic white lead carbonate, bismuth trichloride, and the like can be used.

Also, the layer thickness of titanium dioxide has extremely important meaning in these powders. The transmitted light had strong tendency to become slight yellow and was colored in the case where geometric layer thickness of titanium dioxide was less than 40 µm.

On the other hand, when the layer thickness of titanium dioxide was 40 nm or more, a color appearance of transmitted light which is similar to the interference color can be obtained. The interference colors of gold, red, violet, blue or green were displayed as a concrete products and the transmission of light color appearance was similar to the interference color.

Namely, a reflected interference lights 23 of pale gold, gold, red, violet, blue, and green interference color were obtained in the case where the layer thicknesses of titanium dioxide 12 which were coated on the surface of mica 10 was about 40 nm to 90 nm, about 40 nm to 90 nm, about 90 nm to 110 nm, about 110 nm to 120 nm, about 120 nm to 135 nm, and about 135 nm to 150 nm, respectively, when the interference color of a reflected interference light 23 was observed.

Accordingly, the transmitted light 24 which is in a complementary relation with the interference colors of the reflected interference light 23 were obtained as the interference colors of the color inclining toward pale blue (the color in a complementary relation with gold), the color inclining toward blue (the color in a complementary relation with gold), green, pale yellow, yellow, and red, in the cases where the layer thicknesses of titanium dioxide were about 40 nm to 90 nm, about 40 nm to 90 nm, about 90 nm to 110 nm, about 110 nm to 120 nm, about 120 nm to 135 nm, about 135 nm to 150 nm, respectively.

It is preferable that weight ratio of total titanium oxide/mica is 35/65 or more in order that geometric layer thickness of titanium dioxide in mica 10 which is used in general, can be determined as 40 nm or more, as stated above.

In the following, the embodiment of the present invention is explained according to the drawing.

Figure 5:
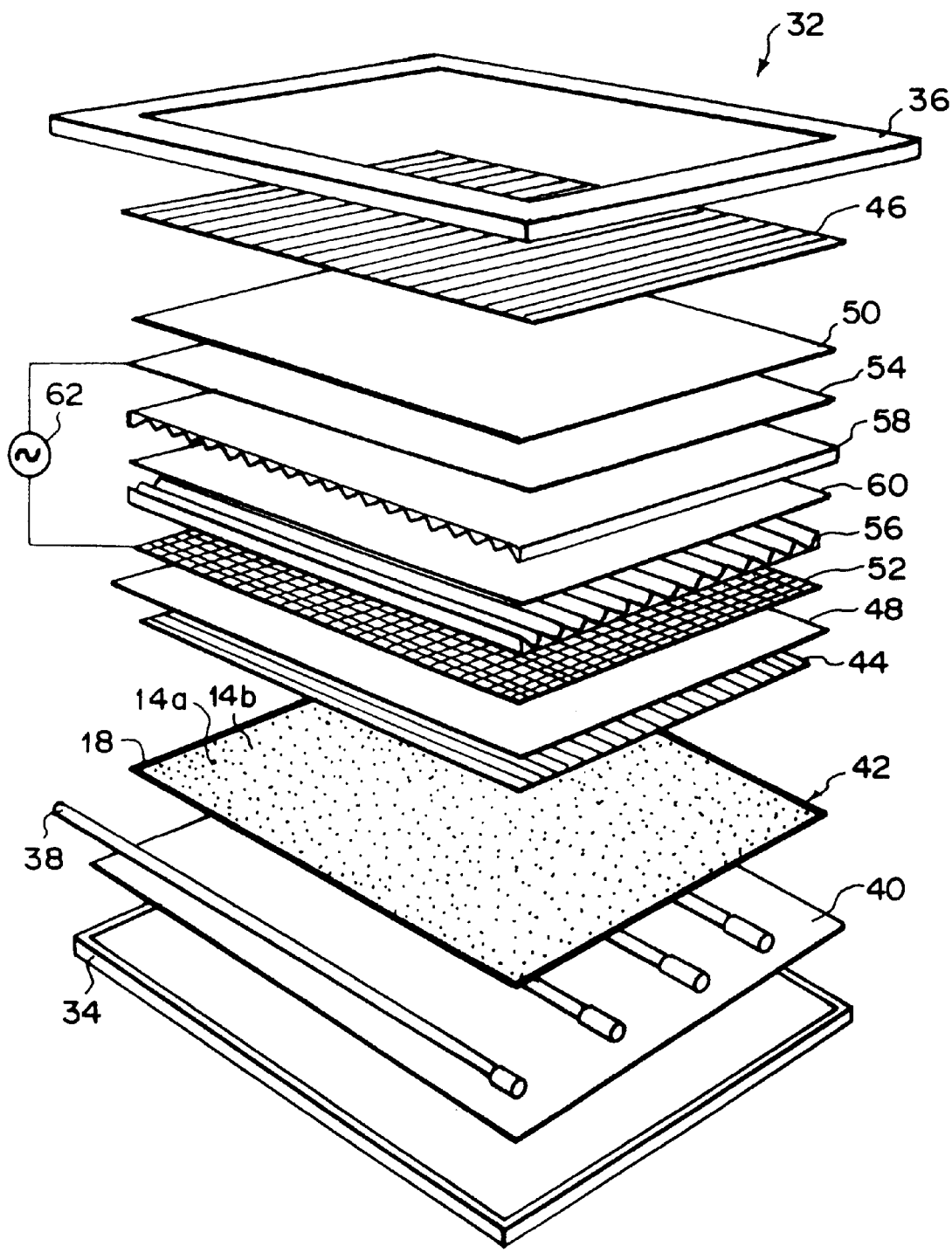
FIG. 5 is an explanatory view of a liquid crystal display element using a diffusing film in accordance with one embodiment of the present invention.

FIG. 5 shows a general constitution of a semitransmissive liquid crystal display element in accordance with an embodiment of the present invention.

The semitransmissive liquid crystal display 32 shown in FIG. 5 comprises a case 34, a bezel 36 which is a frame of LCD panel, an internal light source 38, a reflective film 40, a semitransmissive diffusing film 42, a polarizing film 44 and 46, a glass substrate 48 and 50, a transparent electrode 52 and 54, an alignment film 56 and 58, and a liquid crystal layer 60.

The internal light source 38 irradiates a light flux in the case where the internal light source is switched ON and an irradiation of the light flux stops in the case where the internal light source is switched OFF. As for the internal light source 38, cold-cathode fluorescent lamp, hot-cathode fluorescent lamp, EL (electroluminescence), LED (light emitting diode), incandescence lamp, and the like can be used.

A semitransmissive diffusing film 42 transmits the light flux, which was diffused uniformly, from said internal light source 38 to the direction of the polarizing film 44 in the case where said internal light source 38 is switched ON. Also, in the case where said internal light source 38 is switched OFF, an external light which is entered to the semitransmissive diffusing film and which is diffused and reflected uniformly, reflects to the direction of the polarizing film 44.

The polarizing film 44 is fixed on the bottom of the glass substrate 48 in the drawing and the polarizing film 46 is fixed on the top of the glass substrate 50 in the drawing by adhesive, and the like. Both allow the light flux from the semitransmissive diffusing film 42 to the light flux of the prescribed vibration direction.

The transparent electrode 52 and 54 are composed of ITO film which is mainly composed of indium oxide and are patterned according to its object.

The transparent electrode 52 is installed in the top of the glass substrate 48 in the drawing and the transparent electrode 54 is installed in the bottom of the glass substrate 50 in the drawing, respectively. Orientation of the liquid crystal layer 60 (liquid crystal molecule) between the alignment films 56 and 58 is changed by applying a voltage from the electric source 62 to the transparent electrodes 52 and 54.

As for the liquid crystal layer 60, for example, nematic liquid crystal which is located about 6 µm layer thickness can be used. Also, to maintain a space of the liquid crystal layer in regularly, bead-like or fiber-like fine particles (illustration is not shown) composed of silicon dioxide are used as a spacing material.

The semitransmissive liquid crystal display element 32 in accordance with an embodiment of the present invention is outlined as described above and its function will be explained in the following.

First, on the assumption that the case where the internal light source 38 is switched ON, the case that a light flux from the internal light source 38 is passed through the semitransmissive diffusing film, is explained.

Some light flux from the light source 38 irradiates straightly to the semitransmissive diffusing film 42 which is installed in its forward. Also, among the light flux from the internal light source, the other light flux irradiates to the semitransmissive diffusing film 42 by entered and reflected at the reflective film 40 which is installed in the bottom portion of the drawing.

The light flux from the internal light source 38 which transmitted the semitransmissive diffusing film 34 irradiated to the polarizing film 44.

Next, on the assumption that the case where the internal light source 38 is switched OFF, the case that an external light which irradiates to the semitransmissive diffusing film 42 is reflected, is explained.

The external light irradiated to the semitransmissive diffusing film 42 through various components of the semitransmissive liquid crystal display element 32, i.e., through in order of the polarizing film 46, the glass substrate 50, the transparent electrode 54, the alignment film 58, the liquid crystal layer 60, the alignment film 56, the transparent electrode 52, the glass substrate 48 and the polarizing film 44.

The external light which was irradiated and reflected at the semitransmissive diffusing film 42 irradiated to the polarizing film 44.

The light flux which was passed through the polarizing film 44 becomes a linear polarizing light which has the prescribed vibration direction. As shown in FIG. 6(A), the liquid crystal layer 60 (liquid crystal molecule) is gradually twisted by the notched channel of the alignment films 56 and 58 in the case where voltage is not applied. In here, non-display portion of the semitransmissive liquid crystal display element 32 was observed as white for the user in the case where the internal light source 38 was switched ON, and the portion was observed as white in the case where the internal light source 38 was switched OFF, since the light flux passes through the polarizing film 46 with changing its direction along with a twist of the liquid crystal molecular 60.

On the other hand, the liquid crystal layer 60 (liquid crystal molecule) is oriented to the major axis direction as shown in FIG. 4(B) in the case where a voltage is applied to the transparent electrocodes 52 and 54 which were installed in the forward and backward of the alignment films 56 and 58, respectively, by the electric source 62. In this case, the light flux was shielded by the polarizing film 46 and the shielded portion of the light flux appeared black for the user, since the vibration direction of the light flux passed through the liquid crystal layer 60 was not changed.

In here, the semitransmissive diffusing film 42 comprises the titanium dioxide coated mica 14 shown in FIG. 3. In the titanium dioxide coated mica 14, the layer thickness and the percentage of the titanium dioxide which was coated on the surface of mica were considered so as that the transmitted light 24 and the reflected light 23 of the semitransmissive diffusing film 42 can be obtained with the interference color of the desired color tone.

Therefore, the interference colors of the titanium dioxide coated mica 14 were favorably blended and the transmitted light 24 and the reflected light 23 of the semitransmissive diffusing film 42 was obtained with the reflected light 23 interference color of the desired color tone as a whole.

Also, the semitransmissive diffusing film of the present invention had high using efficiency of the light in comparison with the diffusing film which obtained its color tone by absorbing the optical component of the specific wavelength to color pigment or pigment as is conventional. Accordingly, vivid color tone can be obtained.

Figure 4:
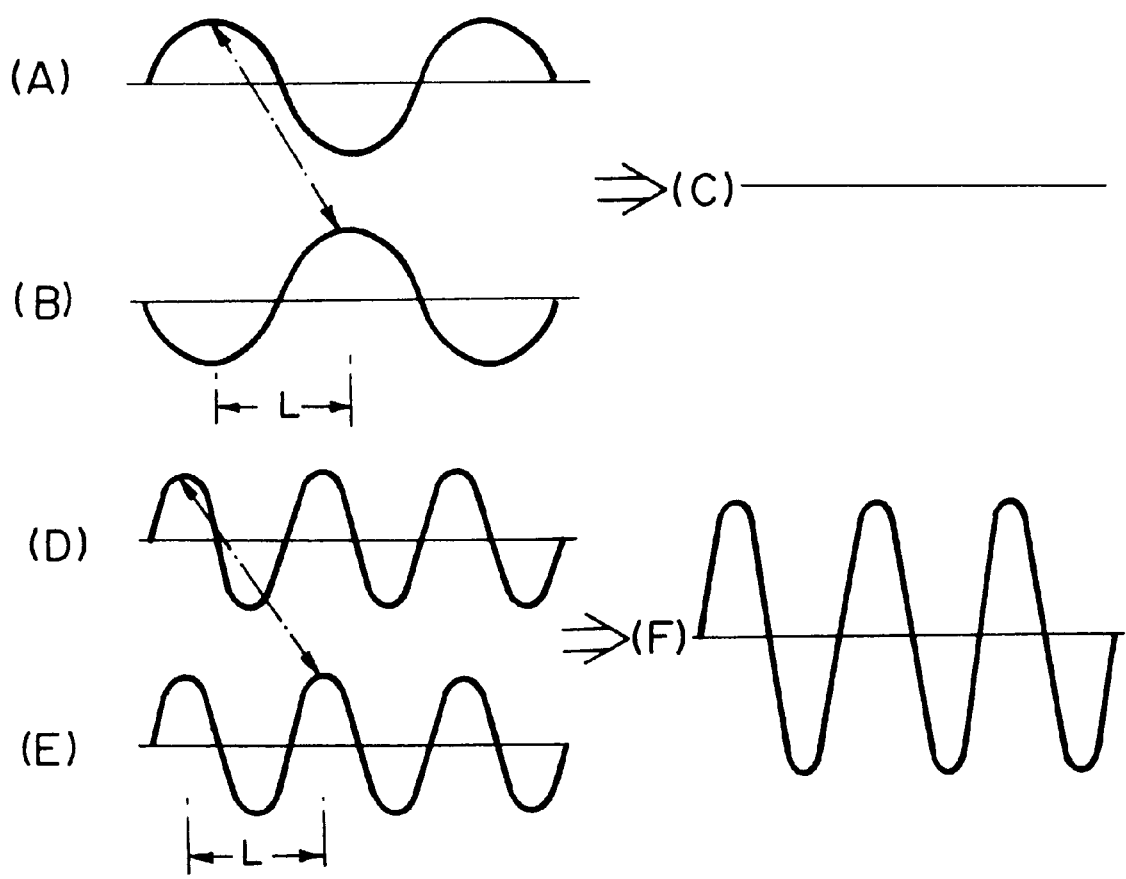
FIG. 4 is an explanatory view of interference light generating action of the powder shown in said FIG. 3.

In FIG. 4, a transmissive liquid crystal display element can be constructed by using a transmissive diffusing film instead of a semitransmissive diffusing film. The diffusing film is used instead of a reflecting film and a reflective liquid crystal display element can be constructed by using a reflective diffusing film when the back lighting 38 and the reflective film 40 are not used.

Also, as for the powder which has a characteristic interference color of the present invention, the more beautiful color tone can be obtained by using titanium dioxide coated synthetic mica which is coated titanium dioxide on the surface of synthetic mica, because the powders used in synthetic mica have less impurities in comparison with the powders used in natural mica.

Manufacturing examples of synthetic mica are shown in the following manufacturing examples 1 to 3.

MANUFACTURING EXAMPLE 1

After mixing 40 parts of silicic anhydride, 30 parts of magnesium oxide, 13 parts of aluminum oxide and 17 parts of potassium silicofluoride, the mixture was dissolved at 1500° C. 100 parts of synthetic fluorine phlogopite powder (synthetic mica 1) diameter 2.5 $\mu$m (circular conversion value measured by CEDIGRAPH 5000-01 manufactured by Micromelitec Inc.: the followings are the same with this) was obtained by grinding roughly and finely synthetic fluorine phlogopite which was crystallized at 1350° C.

MANUFACTURING EXAMPLE 2

After mixing 40 parts of silicic anhydride, 30 parts of magnesium oxide, 13 parts of aluminum oxide and 17 parts of potassium silicofluoride, the mixture was dissolved at 1500° C. 100 parts of synthetic fluorine phlogopite powder (synthetic mica 2) diameter 2.0 $\mu$m was obtained by grinding roughly and finely synthetic fluorine phlogopite which was crystallized at 1350° C.

MANUFACTURING EXAMPLE 3

After mixing 40 parts of silicic anhydride, 30 parts of magnesium oxide, 13 parts of aluminum oxide and 17 parts of potassium silicofluoride, the mixture was dissolved at 1500° C. 100 parts of synthetic fluorine phlogopite powder (synthetic mica 3) diameter 8.5 $\mu$m was obtained by grinding roughly and finely synthetic fluorine phlogopite which was crystallized at 1350° C.

Next, the methods for coating titanium dioxide on the surface of synthetic mica shown in the above-mentioned manufacturing examples 1 to 3 are shown in the following manufacturing examples 4 to 7.

MANUFACTURING EXAMPLE 4

50 parts by weight of said synthetic mica was added to 500 parts of ion-exchanged water and the mixture was stirred sufficiently and dispersed uniformly. 208.5 parts of 40% titanyl sulfate water solution was added to the dispersion and the mixture was stirred and boiled for 6 hours. After cooling, the mixture was filtered and washed with water. 90 parts of titanium dioxide coated synthetic mica (titanated mica 1) was calcining the mixture at 90° C.

MANUFACTURING EXAMPLE 5

50 parts by weight of said synthetic mica was added to 500 parts of ion-exchanged water and the mixture was stirred sufficiently and dispersed uniformly. 312.5 parts of 40% titanyl sulfate water solution was added to the dispersion and the mixture and boiled for 6 hours. After cooling, the mixture was filtered and washed with water 100 parts of titanium dioxide coated synthetic mica (titanated mica 2) was calcining the mixture at 90° C.

MANUFACTURING EXAMPLE 6

50 parts by weight of said synthetic mica was added to 500 parts of ion-exchanged water and the mixture was stirred sufficiently and dispersed uniformly. 208.5 parts of 40% titanyl sulfate water solution was added to the dispersion and the mixture and boiled for 6 hours. After cooling, the mixture was filtered and washed with water. 90 parts of titanium dioxide coated synthetic mica (titanated mica 3) was obtained by drying the mixture at 100° C.

MANUFACTURING EXAMPLE 7

50 parts by weight of said synthetic mica was added to 500 parts of ion-exchanged water and the mixture was stirred sufficiently and dispersed uniformly. 312.5 parts of 40% titanyl sulfate water solution was added to the dispersion and the mixture was stirred and boiled for 6 hours. After cooling, the mixture was filtered and washed with water. 100 parts of titanium dioxide coated synthetic mica (titanated mica 4) was obtained by calcining the mixture at 90° C.

Transmissive Diffusing Film

As for a transmissive diffusing film, a transmissive diffusing film that a polymer which was formed by dispersing the powder in accordance with the present embodiment with film state (e.g., layer thickness 10 μm to 500 μm) can be directly used. Also, a transmissive diffusing film which was formed in film state as like this can be used with set on a transparent substrate. Further, a transmissive diffusing film that the powder in accordance with the present embodiment was incorporated in a substrate can be used.

As for the substrate, glass, nitrocellulose, acrylic polymer, polycarbonate, polyester, polyurethane, polyethylene terephthalate (PET) and the like can be used.

Also, a diffusing film can be manufactured by coating the powder in accordance with the present invention on the substrate as an ink.

As for the ink prepared with said powder, the ink which was dispersed and mixed said powder into a resin binder such as polyacryl, polyurethane, polycarbonate, polyester and the like, can be used.

Also, as for said coating methods, screen printing method, roll coater, offset printing method, knife coater, comma coater, and the like can be listed as an example.

Also, as for the substrate, transparent, semitransparent and white plastic sheet (thickness about 10 μm to 1000 μm), and the like can be used. For example, polyolefines such as polyvinyl chloride, polyethylene, polypropylene, and the like, polyesters such as polyethylene terephthalate and the like, resins such as polystyrene, polycarbonate, acrylic resin, polyurethane resin and the like, can be used. Also, 20 wt % to 100 wt % of a plasticizer can be added to the resin as occasion demands.

Also, surface finishing such as embossing finish and the like can be conducted, as occasion demands.

Further, 1 wt % to 50 wt % of white pigment, transparent particle, plastic bead, and the like can be added with respect to the powder of the present embodiment for the purpose of toning the color tone of the transmitted light at the diffusing film.

As for the white pigment, titanium dioxide coated natural or synthetic mica which has no interference color, natural mica, synthetic mica, barium sulfate, barium oxide, titanium dioxide, zinc oxide, magnesium oxide, titanium dioxide, silica particle, plastic bead, acrylic bead, nylon bead, polystyrene bead, polysilicone bead and the like can be listed as an example.

As stated above, according to the liquid crystal display element 26 in accordance with the present embodiment, titanium dioxide coated mica 14 which was shown in FIG. 3 was used in the diffusing film 38 as the powder.

Therefore, a transmitted light at the diffusing film 38 can be obtained with white color in the case where white light was irradiated to the diffusing film 38, because an optical component which has specific wavelength absorbed by titanium dioxide coated mica 14, can be favorably diffused as an incident light to the diffusing film 38 and can be favorably complemented by the interference color of titanium dioxide coated mica 14.

However, a diffusing film, a lighting unit, and a liquid crystal display element of the present invention are not limited to said various constitutions, the various formations can be adopted within the range of the essentials of the invention.

Namely, the diffusing film of the present embodiment can be used for TN type liquid crystal display element, STN type display, DSTN type display, F-STN type display, CSH type display, ferroelectric liquid crystal type display element, and the like.

Figure 1:
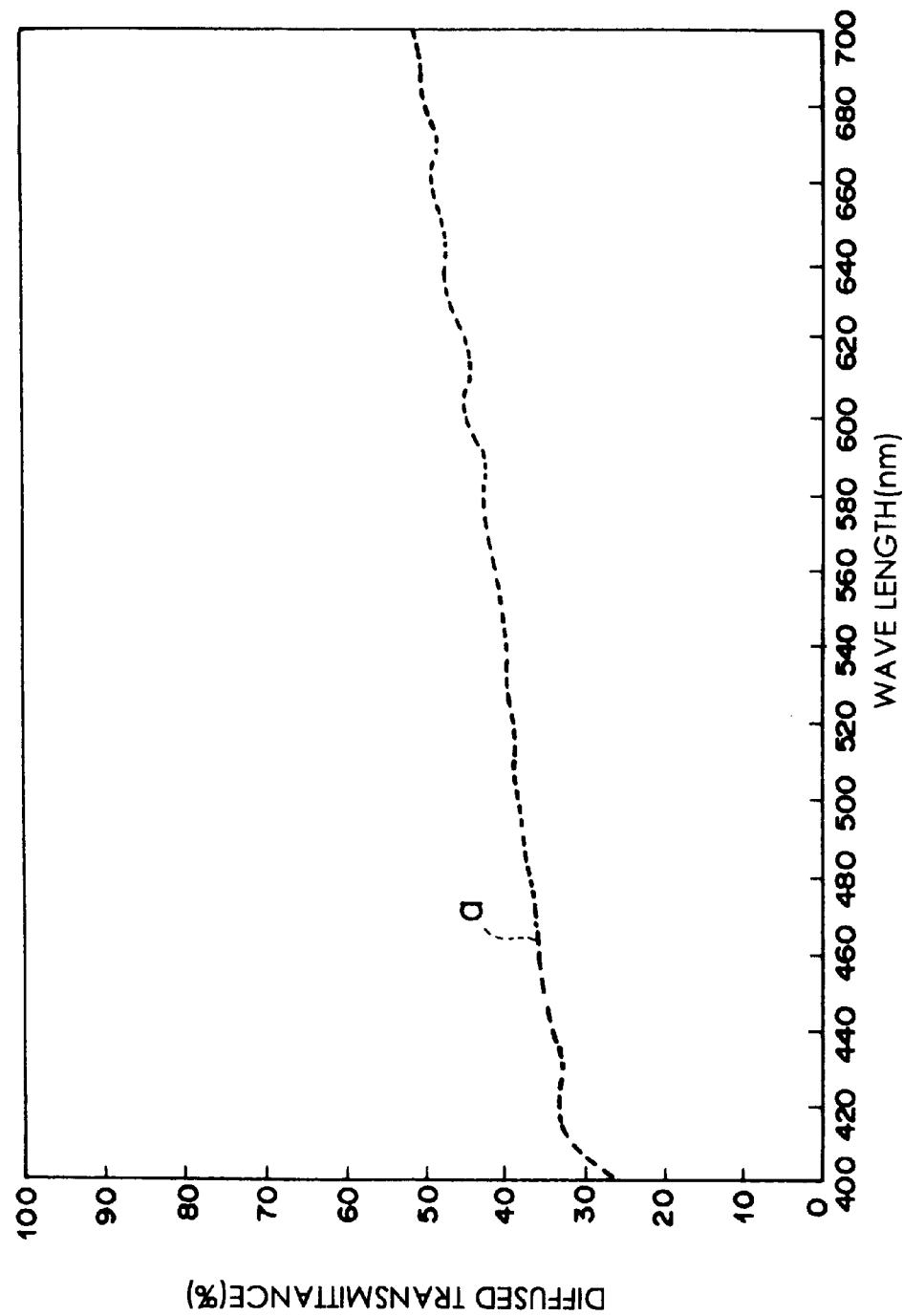
FIG. 1 is an explanatory view of an example of light transmittance spectrum of the conventional transmissive diffusing film.
Figure 2:
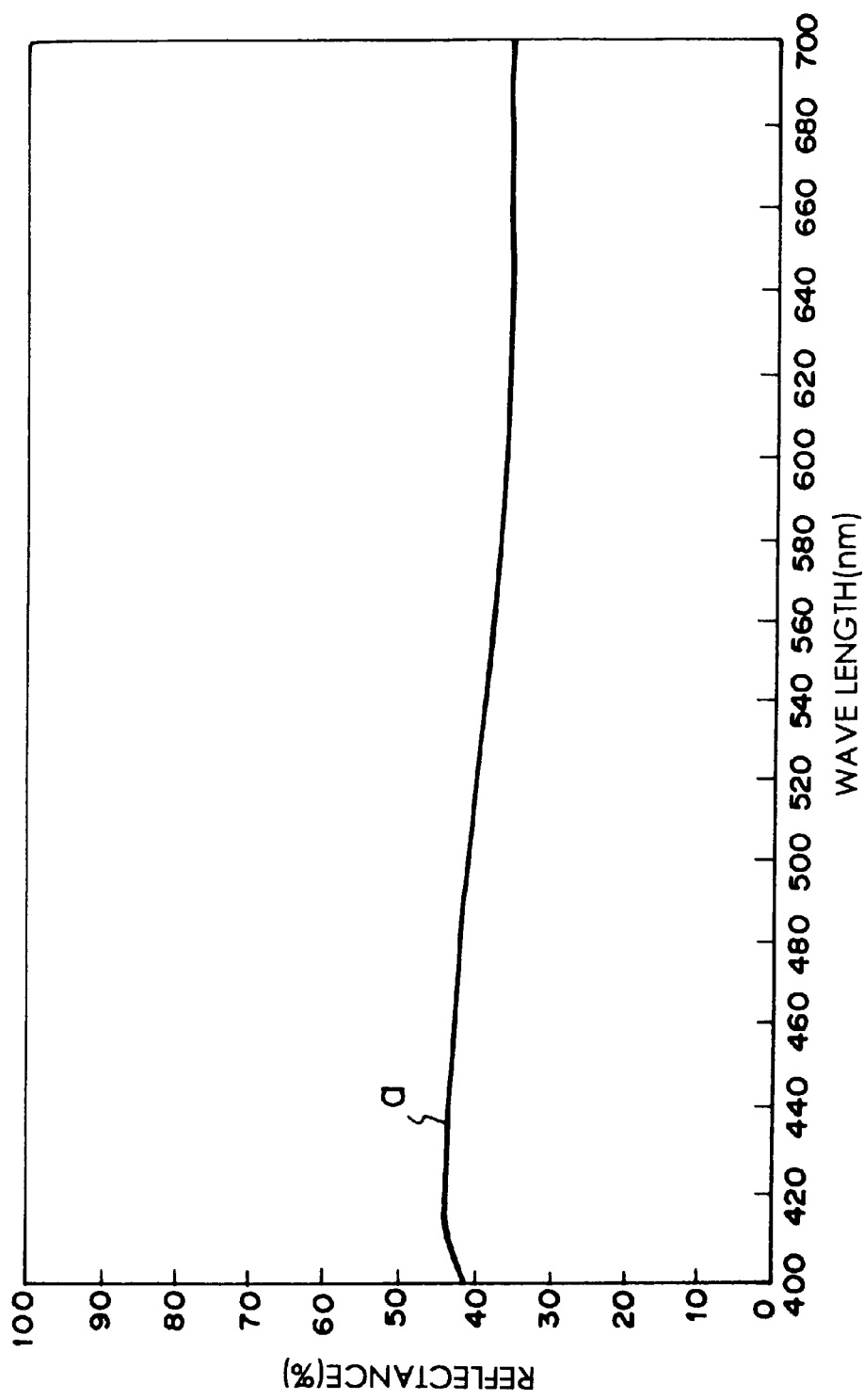
FIG. 2 is an explanatory view of an example of light reflectance spectrum of the conventional reflective diffusing film.

In said constitutions, the case that one of titanium dioxide coated mica 14 shown in FIG. 2 was used as the powder, was explained. Instead of this, two or more titanium dioxide coated mica (powder) whose interference colors are complementary to each other, can be used.

Also, concrete manufacturing process of the liquid crystal display element of the present embodiment is shown in the following manufacturing process 1-1.

Manufacturing Process 1-1

First, the powder in accordance with the present invention was added to an acrylic resin lacquer. Then, the mixture which was dispersed and mixed by a homogenizer was printed on polyethylene terephthalate which deposited aluminum so as that thickness could be 50 μm by screen printing method. A diffusing film was manufactured by heating and hardening it at 60° C.

A transmissive liquid crystal display element was manufactured by sticking the obtained diffusing film in the state that said powder layer was set to the top, to the reverse side of normally white mode TN-type liquid crystal display (installed so as to cross the polarizing film each other).

Figure 7:
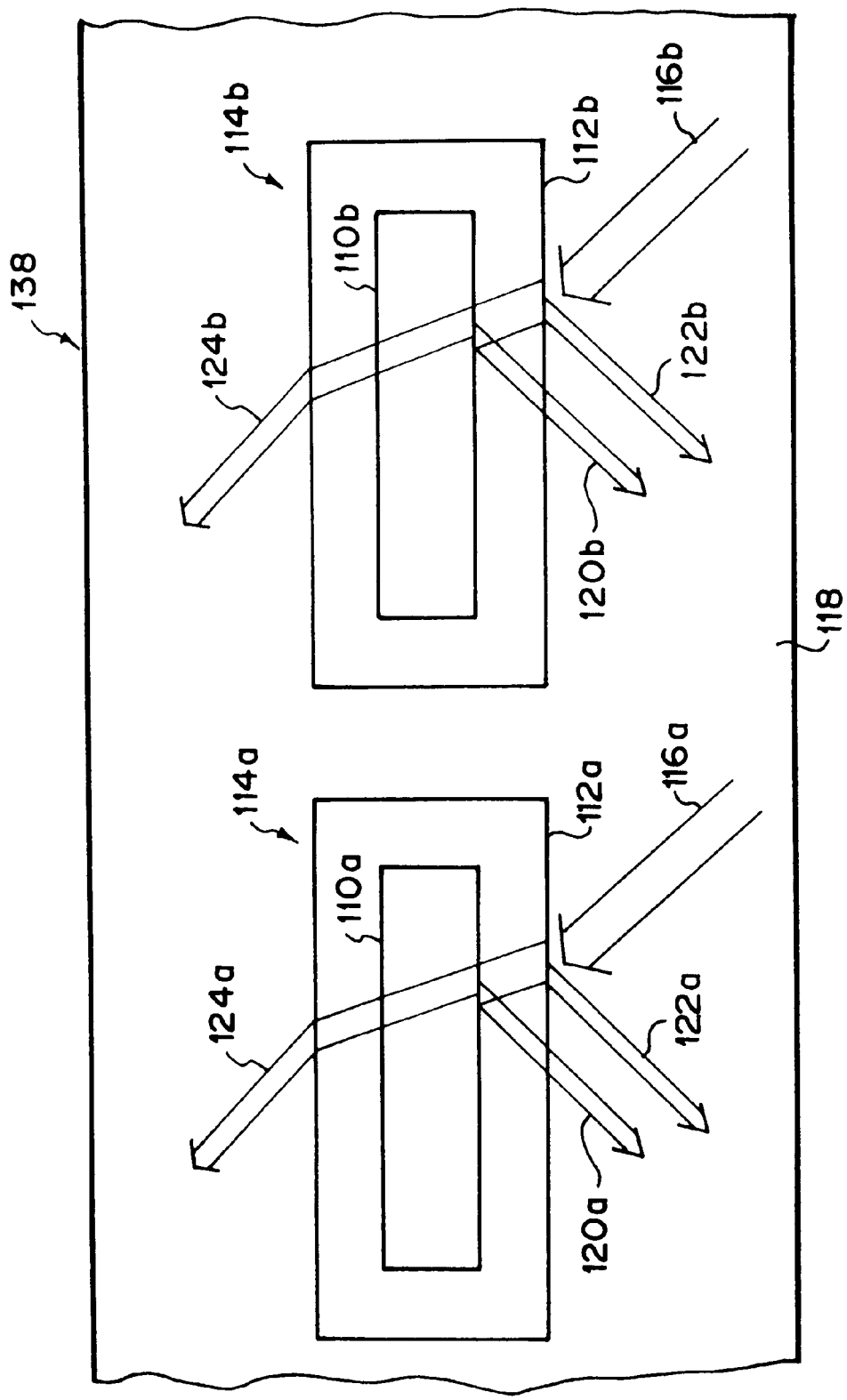
FIG. 7 is an explanatory view of action of a powder used in a diffusing film in accordance with one embodiment of the present invention.

FIG. 7 shows the principal part of a liquid crystal display element in accordance with one embodiment of the present invention. The portions which are equivalent to FIG. 3 are shown by adding a mark 100 and are not explained.

The characteristic point of this embodiment was that two kinds of the powder that each interference color was in a complementary relation, were used.

In FIG. 7, in the case where a layer thickness of a titanium dioxide 112a in a titanium dioxide coated mica 114a was determined so as that a transmitted light 124a could be obtained by, for example, red interference color, a layer thickness of a titanium dioxide 112b in a titanium dioxide coated mica 114b was determined so as that a transmitted light 124b can be obtained with green interference color which was in a complementary relation with red interference color of said titanium dioxide coated mica 114a.

Therefore, in the case where white light was irradiated to the diffusing film 138 of the present embodiment, the transmitted light 124a (e.g., red interference color) of the titanium dioxide coated mica 114a and the transmitted light 124b (e.g., green interference color) of the titanium dioxide coated mica 114b were favorably blended. Accordingly, a transmitted light at the diffusing film could be obtained with white interference color as a whole.

In the following, a preferable examples of the present invention will be explained. However, the present invention is not limited to these examples.

EXAMPLE 1-1

In example 1-1, a substance which dispersed titanium dioxide coated mica A (average particle diameter 10 μm to 60 μm, total 1.0 g) in 15 g of acrylic lacquer, was coated on PET film by a barcoater with 200 μm layer thickness with dry state.

In this example 1-1, the layer thickness distribution of titanium dioxide was determined so as that titanium dioxide coated mica A had an interference color of the same wave range with an absorption wave range. Namely, the layer thickness of titanium dioxide was determined as 20 to 90 nm in titanium dioxide coated mica A.

Figure 8:
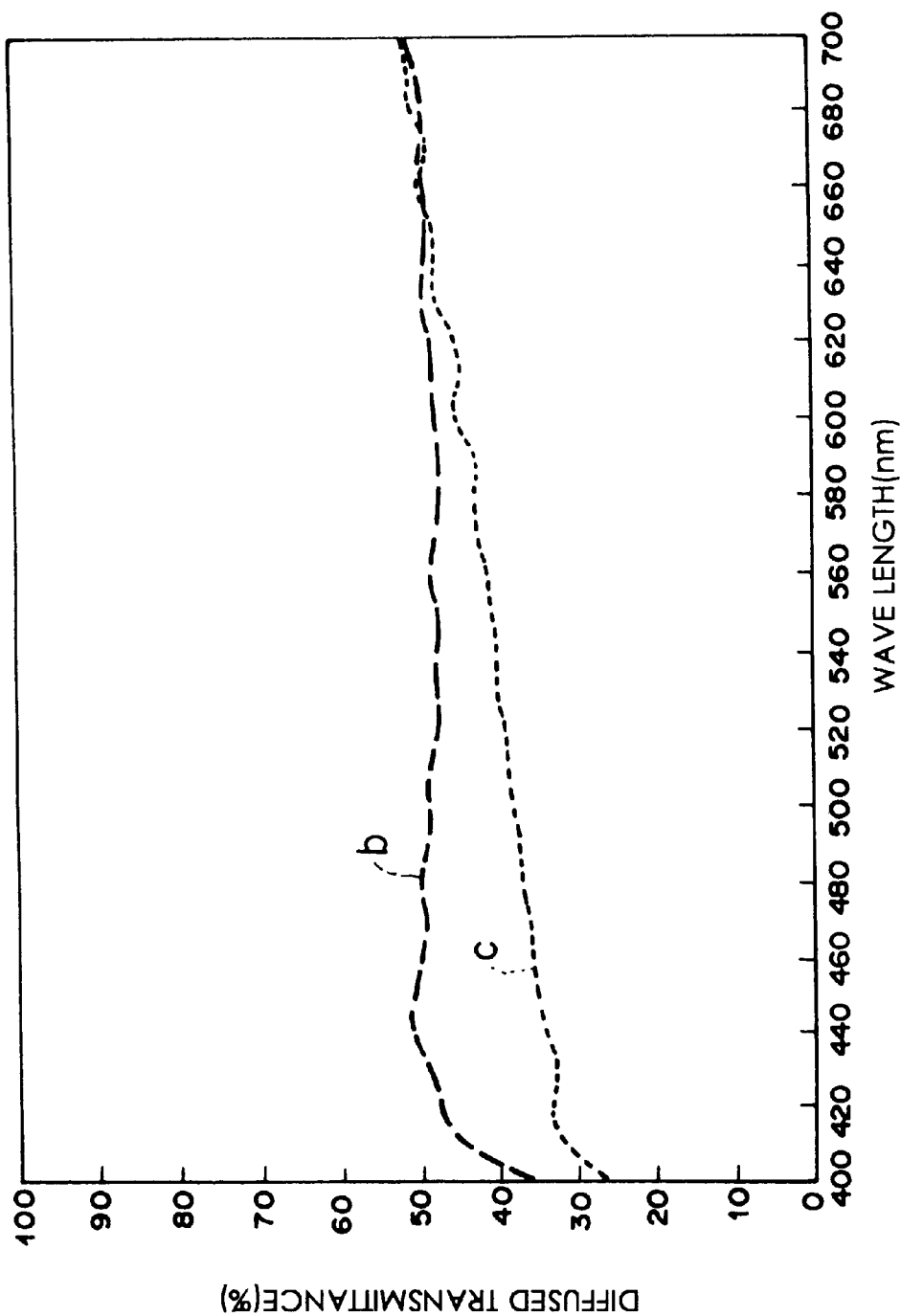
FIG. 8 is a comparative explanatory view of light transmittance in the cases where a diffusing film in accordance with one example of the present invention and the conventional diffusing film were used.

In FIG. 8, a comparison result of light transmittance between the cases that the diffusing film of example 1-1 and conventional diffusing film were used is shown.

b in FIG. 8 is a diffusing film in accordance with example 1-1 and c in FIG. 8 is the diffusing film which used titanium dioxide coated mica that layer thickness of titanium dioxide which was coated on the surface of mica was not determined at all.

As a result, it is understood that light transmittance was almost flat in the range of 400 nm to 700 nm in the case where b in FIG. 8 which shows this example 1-1 was compared with c in FIG. 8 which shows conventional example.

Namely, according to the diffusing film of this example 1-1, it is understood that the optical component which had the absorption wave range of titanium dioxide coated mica A was favorably complemented by the interference color of titanium dioxide coated mica A.

EXAMPLE 1-2

In example 1-2, a substance which dispersed titanium dioxide coated mica B and C (both average particle diameters 10 μm to 60 μm, total 2.0 g) in 15 g of acrylic lacquer, was coated on PET film by a barcoater with 200 μm layer thickness with dry state.

In this example 1-2, the layer thickness of titanium dioxide was determined so as that the transmitted light of titanium dioxide coated mica B was obtained with yellow interference color. Namely, the layer thickness of titanium dioxide was determined as 40 nm to 60 nm in titanium dioxide coated mica B.

To the contrary, in titanium dioxide coated mica C, the layer thickness of titanium dioxide was determined so as that the transmitted light of titanium dioxide coated mica C was obtained with blue interference color which was in a complementary relation with yellow interference color of said titanium dioxide coated mica B. Namely, the layer thickness of titanium dioxide was determined as 60 nm to 80 nm in titanium dioxide coated mica C.

Figure 9:
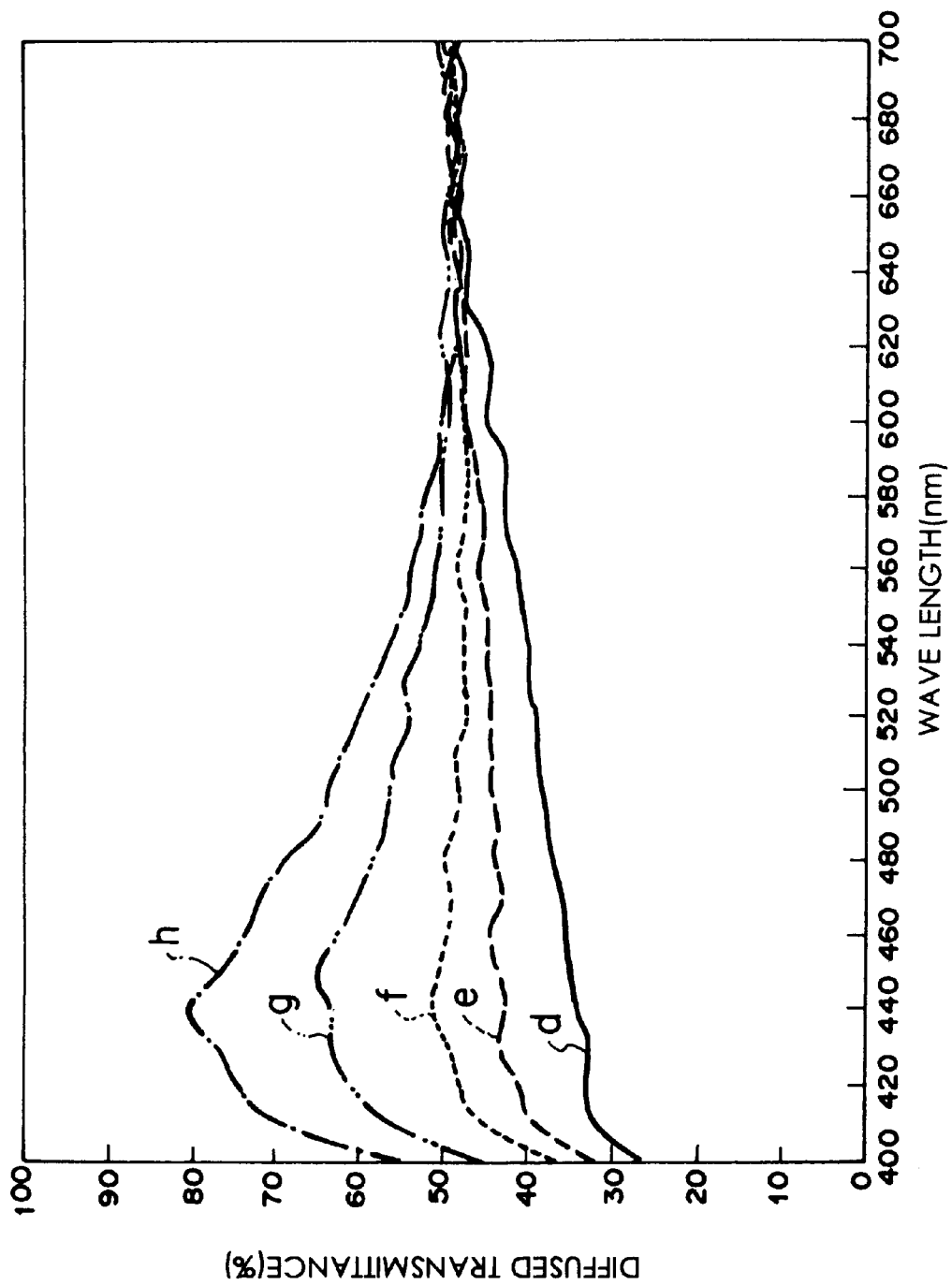
FIG. 9 is an explanatory view of light transmittance spectrum in the case where the percentages of two titanium dioxide coated mica were variously changed in the diffusing film of the present invention.

In FIG. 9, a comparison result of light transmittance in the cases where the percentages of titanium dioxide coated mica B and C which were used in the diffusing film of this example 1-2 were variously changed is shown.

Each of d, e, f, g and h in FIG. 9 shows the light transmittance in the cases where the percentages of titanium dioxide coated mica B and C were 100:0, 75:25, 50:50, 25:75, 0:100, respectively.

As a result, it is understood that the transmitted light in the diffusing film could be obtained with yellow interference color by titanium dioxide coated mica B, as shown in d of FIG. 9 in the case where the percentage of titanium dioxide coated mica B and C was 100:0.

Also, it is understood that the transmitted light in the diffusing film could be obtained with blue interference color by titanium dioxide coated mica C, as shown in h of FIG. 9 in the case where the percentage of titanium dioxide coated mica B and C was 0:100.

To the contrary, in the case where the percentage of titanium dioxide coated mica B and C was 50:50, it is understood that the transmitted light in the diffusing film could be obtained with white interference color that was favorably blended by yellow interference color of titanium dioxide coated mica B and blue interference color of titanium dioxide coated mica C as shown in f of FIG. 9.

According to the diffusing film of this example 1-2, the transmitted light in the diffusing film could be obtained with much whiter interference color by using titanium dioxide coated mica B and C at the percentage of 50:50. Namely, in the case where white light was entered into the diffusing film, yellow interference color of titanium dioxide coated mica B and blue interference color of titanium dioxide coated mica C were favorably blended.

Further, though the transmitted light in the diffusing film could be obtained with much whiter interference color in the case where titanium dioxide coated mica B and C were used at the percentage of 50:50 as stated above, the transmitted light in the diffusing film still could be obtained with satisfactory and nearly white color tone in the cases where titanium dioxide coated mica B and C were used at the percentages of 25:75 to 75:25 as shown in e and g of FIG. 9.

EXAMPLE 1-3

In example 1-3, a substance which dispersed titanium dioxide coated mica D and titanium dioxide ($TiO_2$) as white pigment E (both average particle diameters 10 μm to 60 μm, total 2.0 g) in 15 g of acrylic lacquer, was coated on PET film by a barcoater with 200 μm layer thickness with dry state.

In this example 1-3, the layer thickness of titanium dioxide was determined so as that the transmitted light of titanium dioxide coated mica C was obtained with yellow interference color. Namely, the layer thickness of titanium dioxide was determined as 60 nm to 80 nm in titanium dioxide coated mica D.

Figure 10:
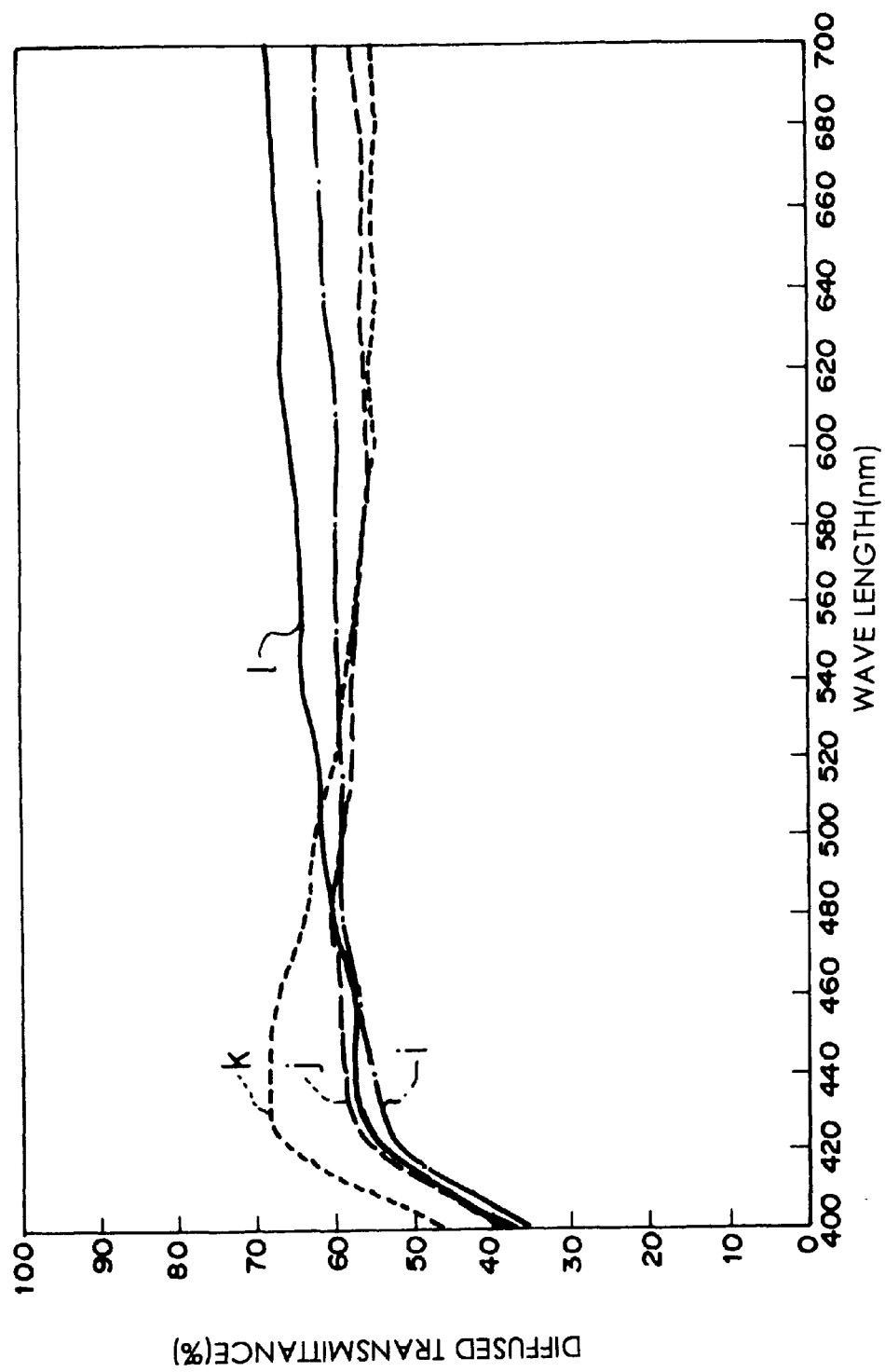
FIG. 10 is an explanatory view of light transmittance spectrum in the case where the percentages of titanium dioxide coated mica and white pigment were variously changed in the diffusing film of the present invention.

In FIG. 10, a comparison result of light transmittance in the case where the percentages of titanium dioxide coated mica D and white pigment E which were used in the diffusing film of this example 1-3 were variously changed is shown.

Each of i, j, k and I in FIG. 10 shows the light transmittance in the cases where the percentages of titanium dioxide coated mica D and white pigment E were 75:25, 50:50, 25:75, 0:100, respectively.

As a result, as is clear from i to l in FIG. 9, according to the diffusing film of this example 1-3, it is understood that the color tone of the transmitted light in the diffusing film could be toned properly by adding white pigment E with respect to titanium dioxide coated mica D.

EXAMPLE 1-4

In example 1-4, a substance which dispersed titanium dioxide coated mica F and G (both average particle diameters 10 µm to 60 µm, total 2.0 g) in 15 g of acrylic lacquer, was coated on PET film by a barcoater with 200 µm layer thickness with dry state.

In this example 1-4, the layer thickness of titanium dioxide was determined so as that the transmitted light of titanium dioxide coated mica F was obtained with green interference color. Namely, the layer thickness of titanium dioxide was determined as 80 nm to 100 nm in titanium dioxide coated mica F.

To the contrary, the layer thickness of titanium dioxide was determined so as that the transmitted light of titanium dioxide coated mica G was obtained with red interference color which was in a complementary relation with green interference color of said titanium dioxide coated mica F. Namely, the layer thickness of titanium dioxide was determined as 140 nm to 160 nm in titanium dioxide coated mica G.

Figure 11:
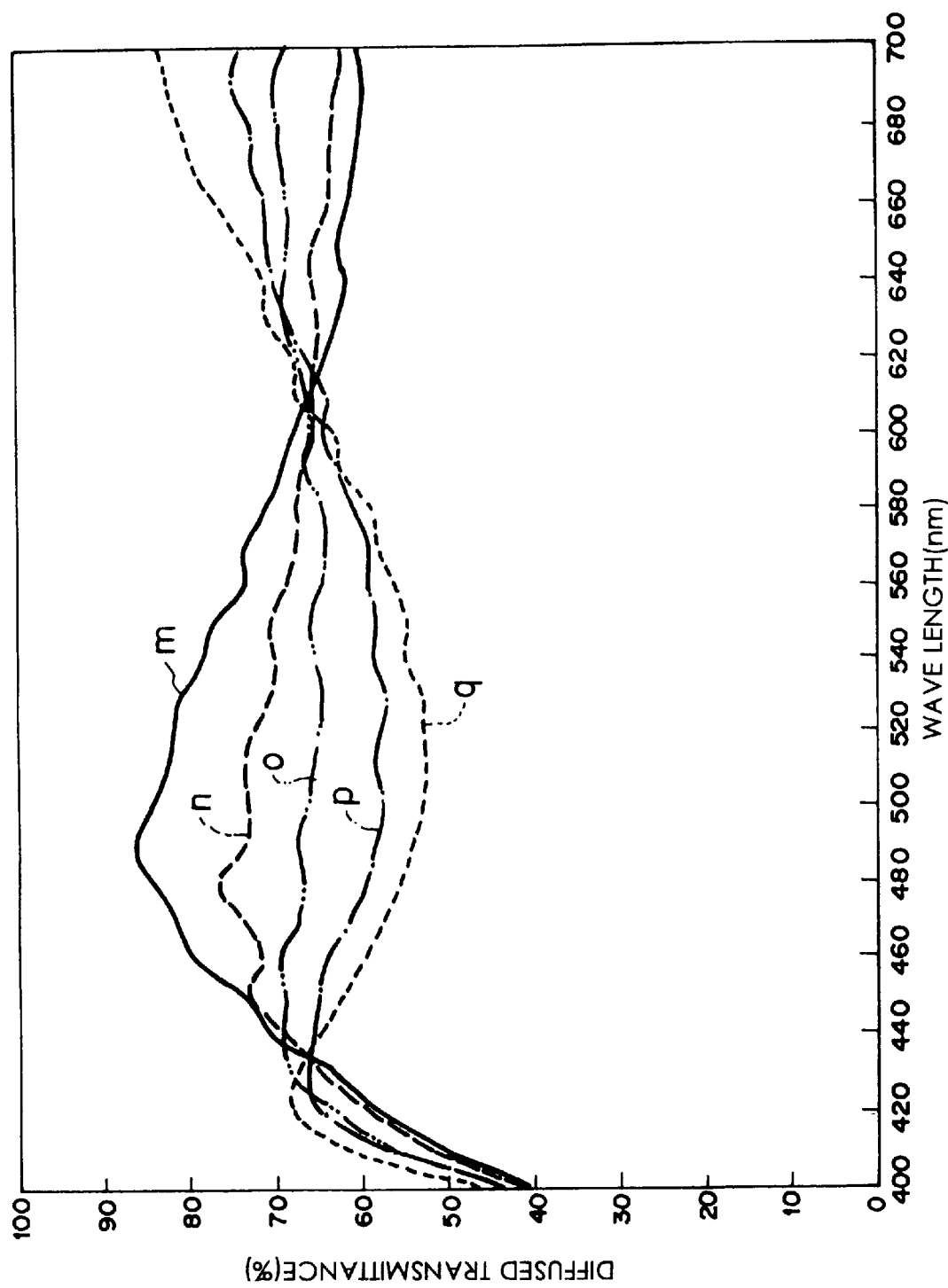
FIG. 11 is an explanatory view of light transmittance spectrum in the case where the percentages of two titanium dioxide coated mica were variously changed in the diffusing film of the present invention.

In FIG. 11, a comparison result of light transmittance in the case where the percentages of titanium dioxide coated mica F and G which were used in the diffusing film of this example 1-4 were variously changed is shown.

Each of m, n, o, p, and q in FIG. 11 shows the light transmittance in the cases where the percentages of titanium dioxide coated mica F and G were 100:0, 75:25, 50:50, 25:75, 0:100, respectively.

As a result, it is understood that the transmitted light in the diffusing film could be obtained with green interference color by titanium dioxide coated mica F, as shown in m of FIG. 11 in the case where the percentage of titanium dioxide coated mica F and G was 100:0.

Also, it is understood that the transmitted light in the diffusing film could be obtained with red interference color by titanium dioxide coated mica G, as shown in q of FIG. 11 in the case where the percentage of titanium dioxide coated mica F and G was 0:100.

To the contrary, in the case where the percentage of titanium dioxide coated mica F and G was 50:50, it is understood that the transmitted light in the diffusing film could be obtained with white interference color which was favorably blended by green interference color of titanium dioxide coated mica F and red interference color of titanium dioxide coated mica G as shown in o of FIG. 11.

According to the diffusing film of this example 1-4, the transmitted light in the diffusing film could be obtained with much whiter interference color by using titanium dioxide coated mica F and G at the percentage of 50:50. Namely, in the case where white light was entered into the diffusing film, green interference color of titanium dioxide coated mica F and red interference color of titanium dioxide coated mica G were favorably blended.

Further, though the transmitted light in the diffusing film could be obtained much whiter interference color in the case where titanium dioxide coated mica F and G were used at the percentage of 50:50 as stated above, the transmitted light in the diffusing film could be obtained with satisfactory and nearly white color tone in the case where titanium dioxide coated mica F and G were used at the percentages of 25:75 to 75:25 as shown in n and p of FIG. 11.

As explained above, according to the diffusing film of the present invention, the powder which has an interference color of the same wave range with an absorption wave range was used. Therefore, the transmitted light in the diffusing film could be obtained with white, in the case where white light was entered into the diffusing film, since an optical component which was absorbed by the powder was favorably complemented by the interference color of the powder.

Also, according to the reflective diffusing film of the present invention, instead of said powder, two or more of the powders which were complementary to each other were used. Therefore, the transmitted light in the diffusing film could be obtained with white, since the interference color of these powder could be favorably blended.

In said reflective diffusing film, the powder that the interference color was in a complementary relation could be obtained the transmitted light in the diffusing film with satisfactory white interference color in the case where 25% to 75% of one powder was added to the other powder.

Also, the more beautiful color tone can be obtained in the case where titanium dioxide coated synthetic mica is used on the surface of synthetic mica as said powder, because the powders used synthetic mica has much less impurities in comparison with the powders used natural mica.

According to the liquid crystal display element in accordance with the present invention, a beautiful image can be obtained by using such diffusing film for the lighting unit and the liquid crystal display element, since a light from a light source can be efficiently used.

Semitransmissive Diffusing Film

According to the semitransmissive diffusing film of the present invention, the semitransmissive diffusing film comprises the powder which has the interference color as stated above. Also, the transmitted light or the reflected light in the semitransmissive diffusing film was obtained with the interference color of the desired color tone as a whole by changing properly the kinds and percentages of these powders and by blending the interference colors of these powders.

Therefore, the semitransmissive diffusing film of the present invention has high using efficiency of the light in comparison with the diffusing film which was obtained its color tone by absorbing an optical component of the specific wavelength into color pigment or pigment as in conventional. Accordingly, a stable vivid color tone can be obtained.

Also, the transmitted light or the reflected light of the semitransmissive diffusing film can be obtained with the interference color of the desired color tone by changing properly the kinds and the percentages of these powders. Further, the favorable toning of the color tone is facilitated.

In said semitransmissive diffusing film, when the powder that the interference color is in a complementary relation, the transmitted light and the reflected light in the semitransmissive diffusing film with satisfactory white interference color can be obtained in the case where 25% to 75% of one powder is added to the other powder.

Also, in said semitransmissive diffusing film, in the case where said powder is set on the substrate, it is preferable that an amount of said powder on the substrate is 0.01 g/m$^2$ to 100 g/m$^2$. To the contrary, in the case where said powder is set in the substrate, it is preferable that an amount of said powder is 1 wt % to 70 wt % in the substrate. Namely, it is possible to favorably coexist light reflectance and light transmittance of the semitransmissive diffusing film by these limitations.

Also, in the semitransmissive liquid crystal display element in accordance with the present invention, the powder which generates a colored interference light was used directly. The transmitted interference light was obtained in the case where the internal light source was switched ON and the reflected interference light which was complementary to said transmitted interference light was obtained in the case where the internal light source was switched OFF. Thus, an excellent design can be revealed by obtaining the various color tones. Also, these color tones can be obtained certainly and stably.

Also, it is preferable that the semitransmissive diffusing film in accordance with the present invention which can obtain the transmitted light and the reflected light with white interference color, is used for the semitransmissive liquid crystal display element of black-and-white display. Namely, it is possible to obtain brightness, visibility, high contrast and wide viewing angle by using said semitransmissive diffusing film.

It is also preferable that the semitransmissive diffusing film in accordance with the present invention which can obtain the transmitted light and the reflected light with the colored interference color of the desired color is used for the semitransmissive liquid crystal display element of two-color display. Namely it is possible to obtain design, brightness, visibility, high contrast and wide viewing angle by using said semitransmissive diffusing film without using such as a color filter.

Further, it is also preferable that the semitransmissive diffusing film in accordance with the present invention which can obtain the transmitted light and the reflected light with white interference color is used for the semitransmissive liquid crystal display element of color display. Namely, it is possible to obtain high reproducibility of color in the color filter, brightness, visibility, high contrast, and wide viewing angle, by using the semitransmissive diffusing film, because, for example, an incident light from said semitransmissive diffusing film to the color filter can be obtained with much whiter color tone.

Figure 12:
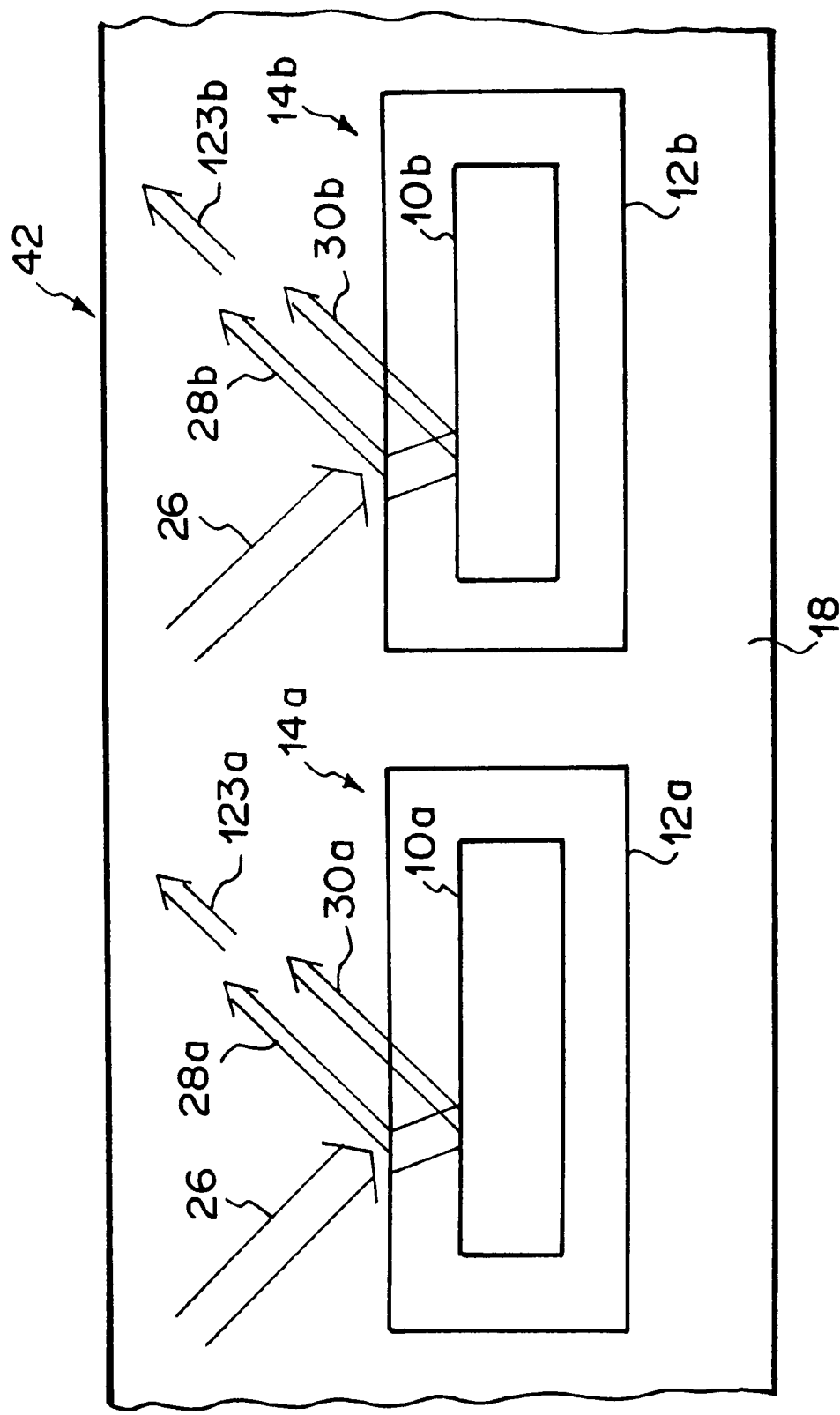
FIG. 12 is an explanatory view of reflective interference light generating condition of a semitransmissive diffusing film in accordance with the present invention.

The powder which has characteristic interference color in the present invention, is typified as shown in FIG. 12.

First, the case where an internal light source of a semitransmissive liquid crystal display element was switched on, is the same as in the case of FIG. 7, since a light flux 16 from the internal light source was transmitted at a semitransmissive diffusing film 42. Namely, for example, in the case where white transmitted light is obtained as a whole by entering the light flux 116 (white light) from the internal light source to the semitransmissive diffusing film 42 (FIG. 12) of this embodiment, when the layer thickness of titanium dioxide 12a in one titanium dioxide coated mica 14a can be obtained the transmitted light 24a with red interference right, the layer thickness of titanium dioxide 12b in other titanium dioxide coated mica 14b is determined as the layer thickness which can be obtained by green interference color which is in a complementary relation with red. Accordingly, in the case where the light flux 16 from the internal light source is entered to the semitransmissive diffusing film 42 of this embodiment, the transmitted light of the semitransmissive diffusing film 42 can be obtained with much whiter interference color as a whole, because the transmitted light 24a (e.g., red interference color) of titanium dioxide coated mica 14a and the transmitted light 24b (e.g., green interference color) of titanium dioxide coated mica 14b are favorably blended.

Next, on the assumption that the case where the internal light source is switched OFF, the case that an external light 26 which is entered and reflected at the semitransmissive diffusing film 42 is explained.

First, as shown in FIG. 12, in the case where the internal light source was switched OFF, a large part of the external light 26 became a reflected light 28 and 30, since the light flux entered into the semitransmissive diffusing film 42 was only the external light 26 in practical.

In here, when white external light 26 was entered into the semitransmissive diffusing film 42 in accordance with this embodiment, the reflected light at semitransmissive diffusing film 42 was obtained with interference color of the color tone which is in a complementary relation with the color tone of the transmitted light at semitransmissive diffusing film 42 shown in FIG. 7 as a whole, because the interference colors of the reflected light at titanium dioxide coated mica 14a and titanium dioxide coated mica 14b were favorably blended.

Also, an improvement of the design can be planned, since a difference color tone can be obtained according to the cases that the internal light source is switched ON and OFF, by using one of titanium dioxide coated mica 14 which has the interference color in the substrate 18, as stated above.

Also, the semitransmissive diffusing film in accordance with one embodiment of the present invention can be manufactured by setting these powders on the substrate (nitrocellulose, acrylic polymer, polycarbonate, polyester, polyurethane, polyethylene terephthalate (PET) and the like), for example, in the conditions that 10 nm to 1000 nm of the layer thickness and 0.01 g/m$^2$ to 100 g/m$^2$ per unit area.

The semitransmissive diffusing film in accordance with one embodiment of the present invention can be also manufactured by incorporating 1 wt % to 70 wt % of these powders into the substrate.

The more concrete manufacturing processes of such semitransmissive diffusing films were shown in the following manufacturing processes 1 to 2.

Manufacturing Process 2-1

A semitransmissive diffusing film can be manufactured by printing or coating the powder (two or more of the powders which has the interference color) on the substrate as an ink.

As for the ink prepared with said powder, the ink which were dispersed and mixed said powder into a resin binder such as polyacryl, polyurethane, polycarbonate, polyester and the like can be used.

Also, as for said coating methods, screen printing method, roll coater, offset printing method, knife coater, comma coater, and the like can be listed as an example.

Also, as for the substrate, transparent, semitransparent and white plastic sheet (thickness about 10 μm to 1000 μm), and the like can be used. For example, polyolefines such as polyvinyl chloride, polyethylene, polypropylene, and the like, polyesters such as polyethylene terephthalate and the like, resins such as polystyrene, polycarbonate, acrylic resin, polyurethane resin and the like can be used. Also, 20 wt % to 100 wt % of a plasticizer can be added to the resin as occasion demands.

Also, surface finishing such as embossing finish and the like can be conducted, as occasion demands.

Manufacturing Process 2-2

A semitransmissive diffusing film can be manufactured by incorporating the powder (two or more of the powders which has the interference color) into a plastic.

As for said plastic, transparent, semitransparent and white plastic sheet (thickness about 10 μm to 1000 μm), and the like can be used. For example, polyolefines such as polyvinyl chloride, polyethylene, polypropylene, and the like, polyesters such as polyethylene terephthalate and the like, resins such as polystyrene, polycarbonate, acrylic resin, polyurethane resin and the like can be used. Also, 20 wt % to 100 wt % of a plasticizer can be added to the resin as occasion demands.

Further, 1 wt % to 50 wt % of white pigment, transparent particle, plastic bead, and the like can be added with respect to these powders for the purpose of toning the color tone of the transmitted light at the semitransmissive diffusing film.

As for the white pigment, titanium dioxide coated mica which has not interference color, mica, barium sulfate, barium oxide, titanium dioxide, zinc oxide, magnesium oxide, titanium dioxide, transparent particle, silica particle, plastic bead, acryl, nylon, polystyrene, polysilicone and the like can be listed as an example. Also, it is preferable that a particle diameters of these powders are 0.1 μm to 200 μm.

Also, the more beautiful color tone can be obtained in the case where titanium dioxide coated synthetic mica which was coated titanium dioxide on the surface of synthetic mica as the powder which has characteristic color tone in the present invention, because the powders used synthetic mica has much less impurities in comparison with the powders used natural mica.

Further, the transmitted light or the reflected light of the semitransmissive diffusing film 42 can be obtained the interference color which has the desired color tone, by properly changing the layer thicknesses and the percentages of titanium dioxides of titanium dioxide coated mica 14a and 14b. Also, favorable toning of the color tone is facilitated.

Also, the color tones of the transmitted light and the reflected light at the semitransmissive diffusing film 42 were complementary to each other. Accordingly, for example, in the semitransmissive liquid crystal display element 32 that one powder which had a colored interference light, a different color tones as shown in the following TABLE 1 were obtained according to the internal light source 38 was switched ON and OFF.

TABLE 1

| Internal light source ON | Internal light source OFF |
|---|---|
| Blue | Yellow |
| Yellow | Blue |
| Red | Green |
| Green | Red |

In sum, for example, in the case where non-display portion of the semitransmissive liquid crystal display element was observed as blue for the user when the internal light source 38 was switched ON, the portion was observed as yellow which was complementary to blue when the internal light source 38 was switched OFF.

Thus an excellent design of the semitransmissive liquid crystal display element 32 can be revealed by properly adjusting the layer thicknesses and the percentages of titanium dioxide of titanium dioxide coated mica 14 in the substrate 18 of the semitransmissive diffusing film 42, so as that the color tone of the semitransmissive liquid crystal display element 32 becomes different according to the cases where the internal light source is switched ON and OFF.

As stated above, according to the semitransmissive liquid crystal display element 32 in accordance with this embodiment, the semitransmissive diffusing film 42 comprises titanium dioxide coated mica 14a and 14b which has an interference color. Namely, the transmitted light or the reflected light at the semitransmissive diffusing film 42 was obtained by the interference color of the desired color tone as a whole by properly changing the layer thicknesses and the percentages of titanium dioxide of titanium dioxide coated mica 14a and 14b and by blending the interference colors of these titanium dioxide coated mica 14a and 14b.

Therefore, the semitransmissive diffusing film of the present invention had high using efficiency of the light in comparison with the diffusing film which was obtained its color tone by absorbing the optical component of the specific wavelength to color pigment or pigment as in conventional. Accordingly, vivid color tone can be obtained in stable.

Also, the transmitted light or the reflected light at the semitransmissive diffusing film 42 can be obtained by the interference color of the desired color tone by properly changing the layer thicknesses and the percentages of titanium dioxide of titanium dioxide coated mica 14a and 14b. Also, favorable toning of the color tone is facilitated.

Also, brightness, visibility, high contrast and wide viewing angle can be obtained by using the semitransmissive diffusing film in accordance with one embodiment which was considered the kinds and percentages of these powders so as that the transmitted light or the reflected light can be obtained with white interference color, in the semitransmissive liquid crystal display element of black-and-white display.

Further, high reproducibility of color in the color filter, brightness, visibility, high contrast, and wide viewing angle can be obtained by using the semitransmissive diffusing film in accordance with one embodiment which was considered the kinds and percentages of these powders so as that the transmitted light or the reflected light can be obtained with white interference color, in the semitransmissive liquid crystal display element of color display. Because, for example, an incident light from said semitransmissive diffusing film to the color filter was obtained with much whiter color tone by using the semitransmissive diffusing film.

Also, an excellent design can be revealed in the case where the semitransmissive liquid crystal display element 32 in accordance with this embodiment was determined so as to obtain the difference color tones according to the cases that the internal light source 38 was switched ON and OFF. Also, these color tones can be obtained certainly and stably.

Also, design, brightness, visibility, high contrast, and wide viewing angle can be obtained by using the semitransmissive diffusing film in accordance with one embodiment which was considered the sorts and the percentages of these powders so as that the transmitted light or the reflected light can be obtained with white interference color, in the semitransmissive liquid crystal display element of two-color display, because the more beautiful desired color tone can be obtained without using such as a color filter.

Also, the more beautiful color tone can be obtained in the case where titanium dioxide coated synthetic mica which was coated titanium dioxide on the surface of synthetic mica shown in said manufacturing examples 1 to 7 was used as these titanium dioxide coated mica 14a and 14b, because the powders used synthetic mica has much less impurities in comparison with the powders used natural mica.

In the following, the preferable examples of the present invention will be explained. However, the present invention is not limited to these examples.

EXAMPLE 2-1

In example 2-1, a substance which dispersed titanium dioxide coated mica A and B whose interference colors are complementary to each other (average particle diameter 10 $\mu$m to 60 $\mu$m, total 2.0 g) in 15 g of acrylic lacquer with 50:50, was coated on PET film by a barcoater with 200 $\mu$m layer thickness with dry state.

In this example 2-1, the layer thickness of titanium dioxide which was coated on the surface of mica was determined as about 40 nm to 60 nm in the titanium dioxide coated mica A and the layer thickness of titanium dioxide which was coated on the surface of mica was determined as about 60 nm to 80 nm in the titanium dioxide coated mica B.

Figure 13:
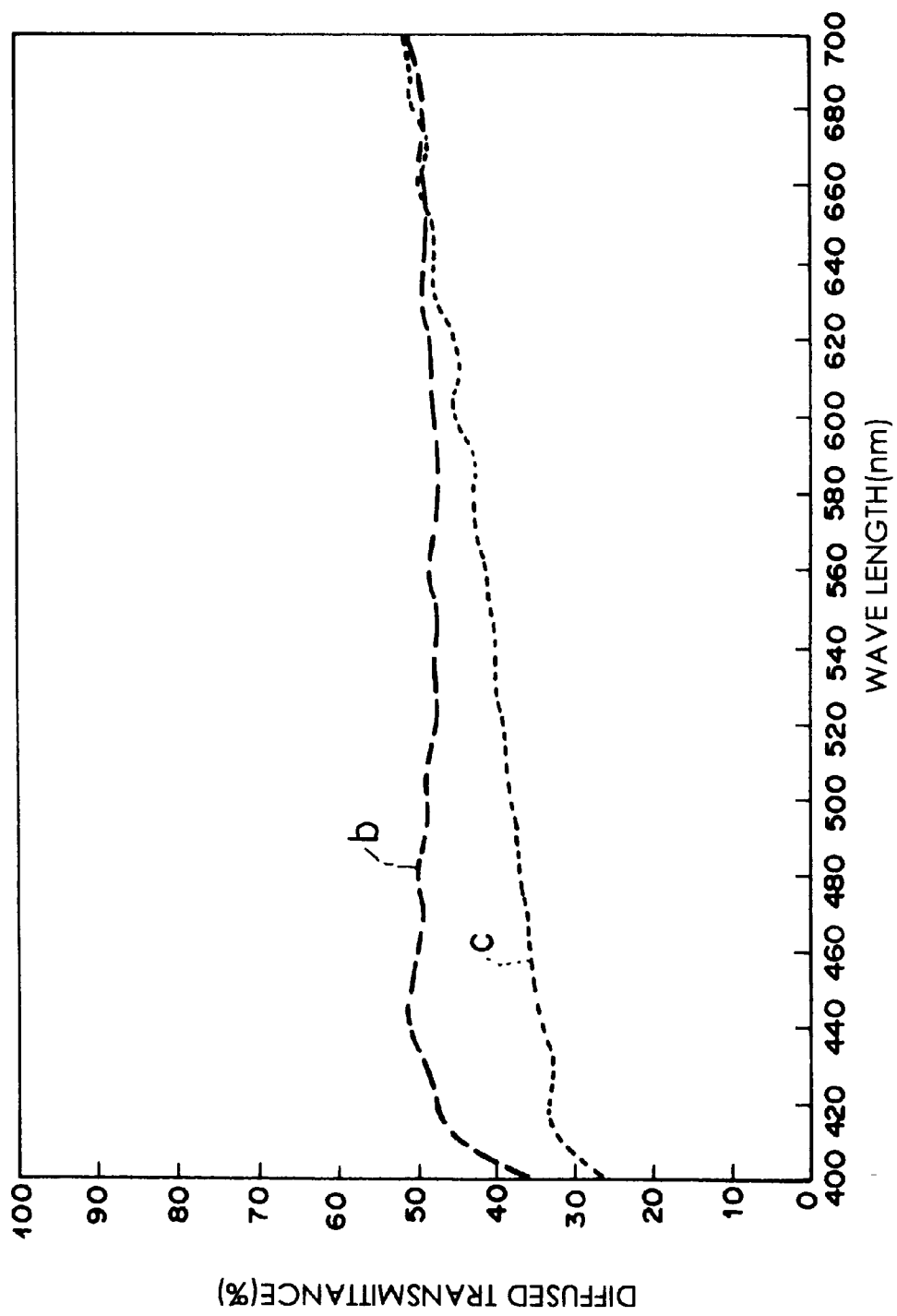
FIG. 13 is a comparative explanatory view of light transmittance spectrum in the cases where the semitransmissive diffusing film in accordance with the present invention and the conventional semitransmissive diffusing film were used.

In FIG. 13, a comparison result of light transmissive spectrum between the cases that the semitransmissive diffusing film of example 2-1 and the conventional semitransmissive diffusing film were used is shown. These light transmittances are the light transmittance at the time (when the reflected light from the semitransmissive diffusing film) was vertically received in the condition of diffused lighting of white light.

b in FIG. 13 is the semitransmissive diffusing film in accordance with example 2-1 and c in FIG. 13 is the semitransmissive diffusing film that one titanium dioxide coated mica which was never considered the layer thickness of titanium dioxide which was coated on the surface of mica.

As a result, it is understood that light transmittance was almost flat in the wave range of 400 nm to 700 nm in the case where b in FIG. 13 which shows example 2-1 was compared with c in FIG. 13 which shows the conventional example.

Figure 14:
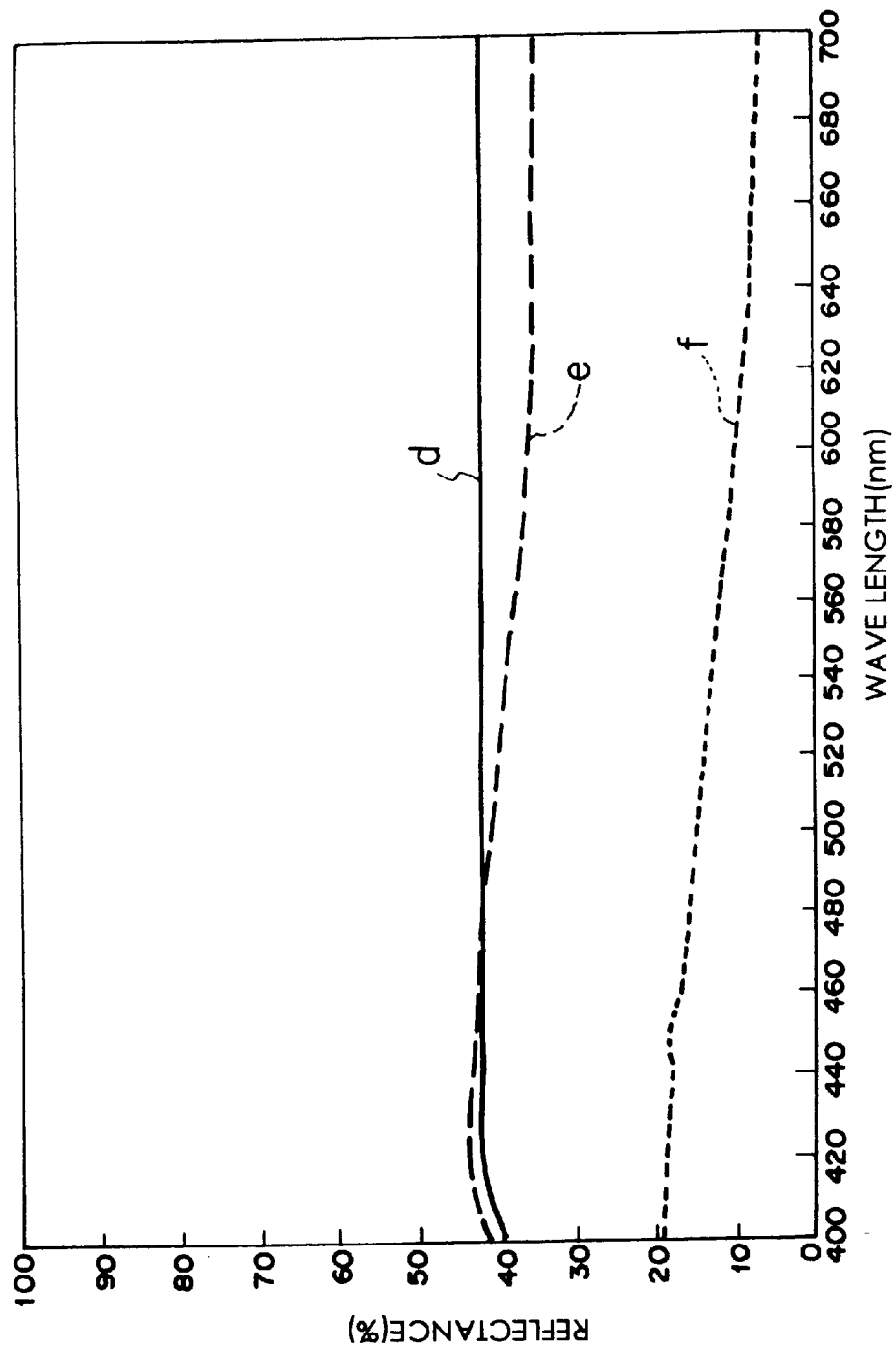
FIG. 14 is a comparative explanatory view of light reflectance spectrum in the cases where the semitransmissive diffusing film in accordance with one example of the present invention and the conventional semitransmissive diffusing film or reflective film were used.

In FIG. 14, a comparison result of light reflective spectrum between the cases that the semitransmissive diffusing film of example 2-1 and the conventional semitransmissive diffusing film or the reflective film were used is shown. These light reflectances are the light reflectance at the time (when the reflected light from the semitransmissive diffusing film) was vertically received in the condition of diffused lighting of white light.

d, e and f in FIG. 14 are the light reflectance of the semitransmissive diffusing film in accordance with example 2-1, the semitransmissive diffusing film which used one of general pearly pigment in conventional and general silver deposited film (reflective film) in conventional, respectively.

As a result, it is understood that light reflectance was almost flat in the case where d in FIG. 14 which shows example 2-1 was compared with e and f in FIG. 14 which shows the conventional examples. In particular, it is understood that light reflectance was largely improved in d of FIG. 14 which shows example 2-1.

Namely, according to the semitransmissive diffusing film of this example 2-1, it is understood that the interference colors of the titanium dioxide coated mica A and the titanium dioxide coated mica B were favorably blended and the color tones of the transmitted light and the reflected light were obtained with much whiter than conventional diffusing film.

EXAMPLE 2-2

In example 2-2, a substance which was uniformly dispersed titanium dioxide coated mica C and D whose interference colors are complementary to each other (average particle diameter 10 $\mu$m to 60 $\mu$m, total 2.0 g) in 15 g of acrylic lacquer, was coated on PET film by a barcoater with 200 $\mu$m layer thickness with dry state.

In this example 2-2, the layer thickness of titanium dioxide was determined so as that the transmitted light of titanium dioxide coated mica C could be obtained with yellow interference color. Namely, the layer thickness of titanium dioxide was determined as 40 nm to 60 nm in titanium dioxide coated mica C.

To the contrary, the layer thickness of titanium dioxide was determined so as that the transmitted light of titanium dioxide coated mica D was obtained with blue interference color which was complementary to yellow interference color of said titanium dioxide coated mica C. Namely, the layer thickness of titanium dioxide was determined as 60 nm to 80 nm in titanium dioxide coated mica D.

Figure 15:
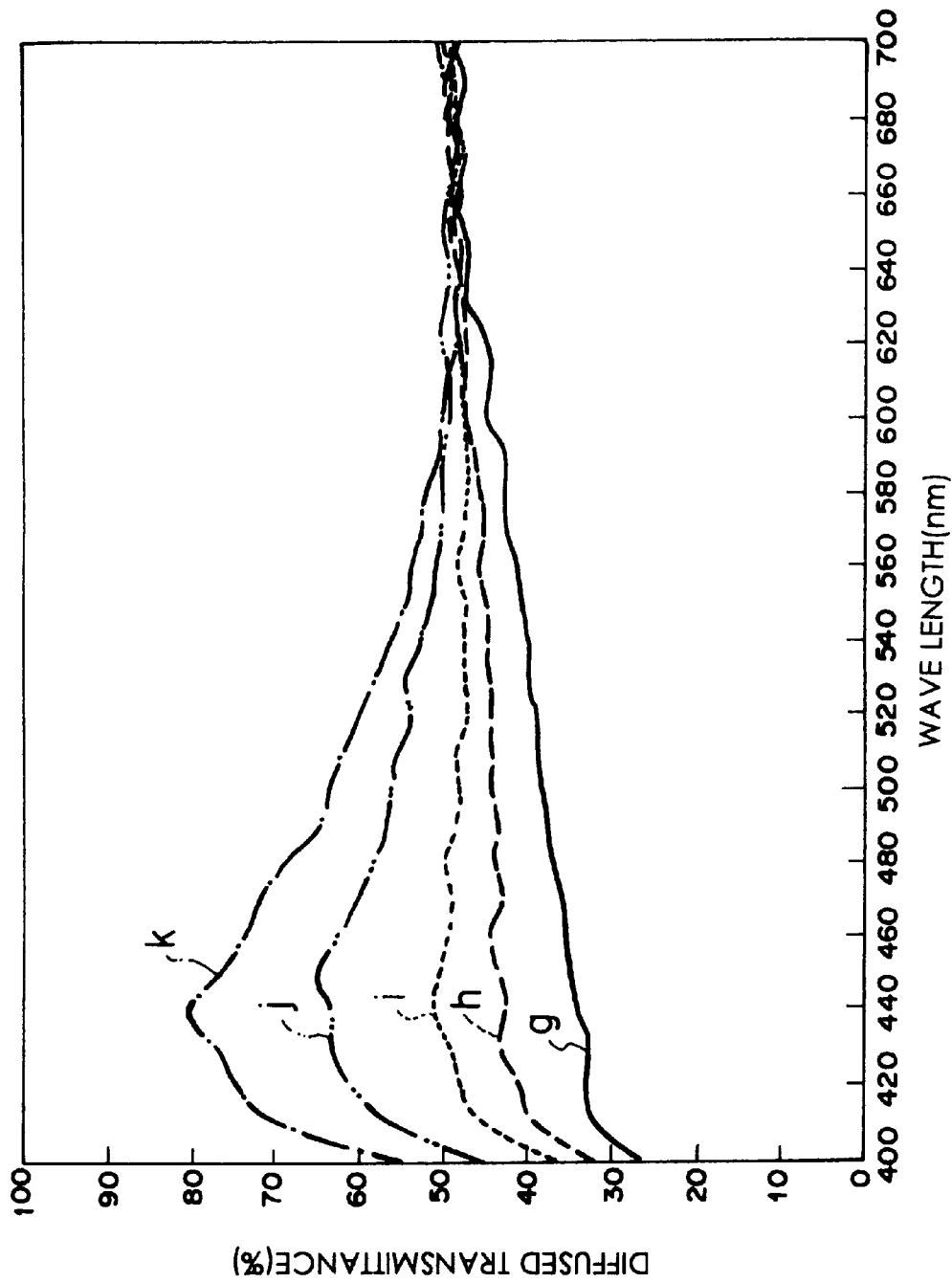
FIG. 15 is a comparative explanatory view of light transmittance spectrum in the case where the percentages of two titanium dioxide coated mica which were used in the semitransmissive diffusing film in accordance with one example of the present invention were variously changed.

In FIG. 15, a comparison result of light transmittance in the cases where the percentages of titanium dioxide coated mica C and D which were used in the semitransmissive diffusing film of this example 2-2 were variously changed is shown. These light transmittances are the light transmittance at the time (when the reflected light from the semitransmissive diffusing film) was vertically received in the condition of diffused lighting of white light.

g, h, i, j and k in FIG. 15 were the light transmittance in the case where the percentages of titanium dioxide coated mica C and D were 100:0, 75:25, 50:50, 25:75, 0:100, respectively.

As a result, it is understood that the transmitted light in the semitransmissive diffusing film can be obtained yellow interference color of titanium dioxide coated mica C as shown in g of FIG. 15 in the case where the percentage of titanium dioxide coated mica C and D which were used in the semitransmissive diffusing film of this example 2-2 was 100:0.

Also, it is understood that the transmitted light in the semitransmissive diffusing film can be obtained blue interference color of titanium dioxide coated mica D as shown in k of FIG. 15 in the case where the percentage of titanium dioxide coated mica C and D was 0:100.

To the contrary, in the case where the percentage of titanium dioxide coated mica C and D was 50:50, it is understood that the transmitted light in the semitransmissive diffusing film could be obtained with much whiter interference color which was favorably blended by yellow interference color of titanium dioxide coated mica C and blue interference color of titanium dioxide coated mica D as shown in i of FIG. 15.

According to the semitransmissive diffusing film of this example 2-2, the transmitted light in the semitransmissive diffusing film could be obtained with much whiter interference color by using titanium dioxide coated mica C and D at the percentage of 50:50 in the case where white light was entered into the semitransmissive diffusing film, since yellow interference color of titanium dioxide coated mica C and blue interference color of titanium dioxide coated mica D were favorably blended.

Further, though the transmitted light in the semitransmissive diffusing film could be obtained with much whiter interference color in the case where titanium dioxide coated mica C and D were used at the percentage of 50:50 as stated above, the transmitted light in the semitransmissive diffusing film could be obtained with satisfactory and nearly white color tone in the case where titanium dioxide coated mica C and D were used at the percentages of 25:75 to 75:25 as shown in h and j of FIG. 15.

EXAMPLE 2-3

In example 2-3, a substance which dispersed titanium dioxide coated mica E and titanium dioxide ($TiO_2$) as white pigment E (average particle diameter 10 μm to 60 μm, total 2.0 g) in 15 g of acrylic lacquer, was coated on PET film by a barcoater with 200 μm layer thickness with dry state.

In this example 2-3, the layer thickness of titanium dioxide was determined so as that the transmitted light of titanium dioxide coated mica E could be obtained with yellow interference color. Namely, the layer thickness of titanium dioxide was determined as 60 nm to 80 nm in titanium dioxide coated mica E.

Figure 16:
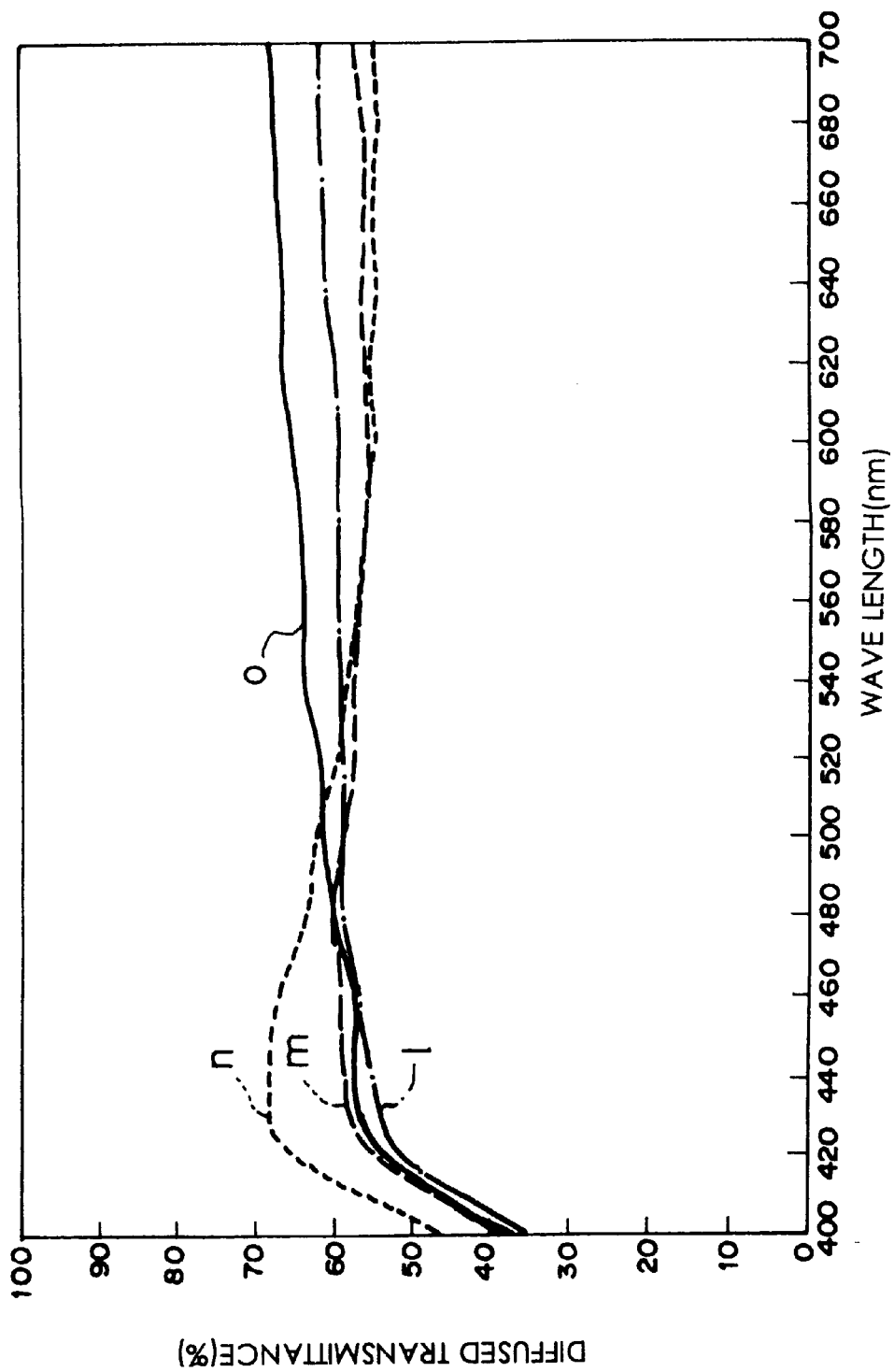
FIG. 16 is a comparative explanatory view of light reflectance spectrum in the case where the percentages of two titanium dioxide coated mica which were used in the semitransmissive diffusing film in accordance with one example of the present invention were variously changed.

In FIG. 16, a comparison result of light transmittance in the cases where the percentages of titanium dioxide coated mica E and white pigment F which were used in the semitransmissive diffusing film of this example 2-3 were variously changed is shown.

l, m, n and o in FIG. 16 were the light transmittance in the cases where the percentages of titanium dioxide coated mica E and white pigment F were 75:25, 50:50, 25:75, 0:100, respectively.

As a result, as is clear from l to o in FIG. 16, according to the semitransmissive diffusing film of this example 2-3, it is understood that the color tone of the transmitted light of the semitransmissive diffusing film can be toned easily by adding white pigment F with respect to the titanium dioxide coated mica E for the purpose of toning the color tone of the transmitted light of the semitransmissive diffusing film.

EXAMPLE 2-4

In example 2-4, a substance which was uniformly dispersed titanium dioxide coated mica G and H whose interference colors are complementary to each other (average particle diameter 10 μm to 60 μm, total 2.0 g) in 15 g of acrylic lacquer, was coated on PET film by a barcoater with 200 μm layer thickness with dry state.

In this example 2-4, the layer thickness of titanium dioxide was determined so as that the transmitted light of titanium dioxide coated mica G could be obtained with green interference color. Namely, the layer thickness of titanium dioxide was determined as 80 nm to 100 nm in the titanium dioxide coated mica G.

To the contrary, the layer thickness of titanium dioxide was determined so as that the transmitted light of titanium dioxide coated mica H can be obtained with red interference color which was complementary to green interference color of said titanium dioxide coated mica G. Namely, the layer thickness of titanium dioxide was determined as 140 nm to 160 nm in the titanium dioxide coated mica H.

Figure 17:
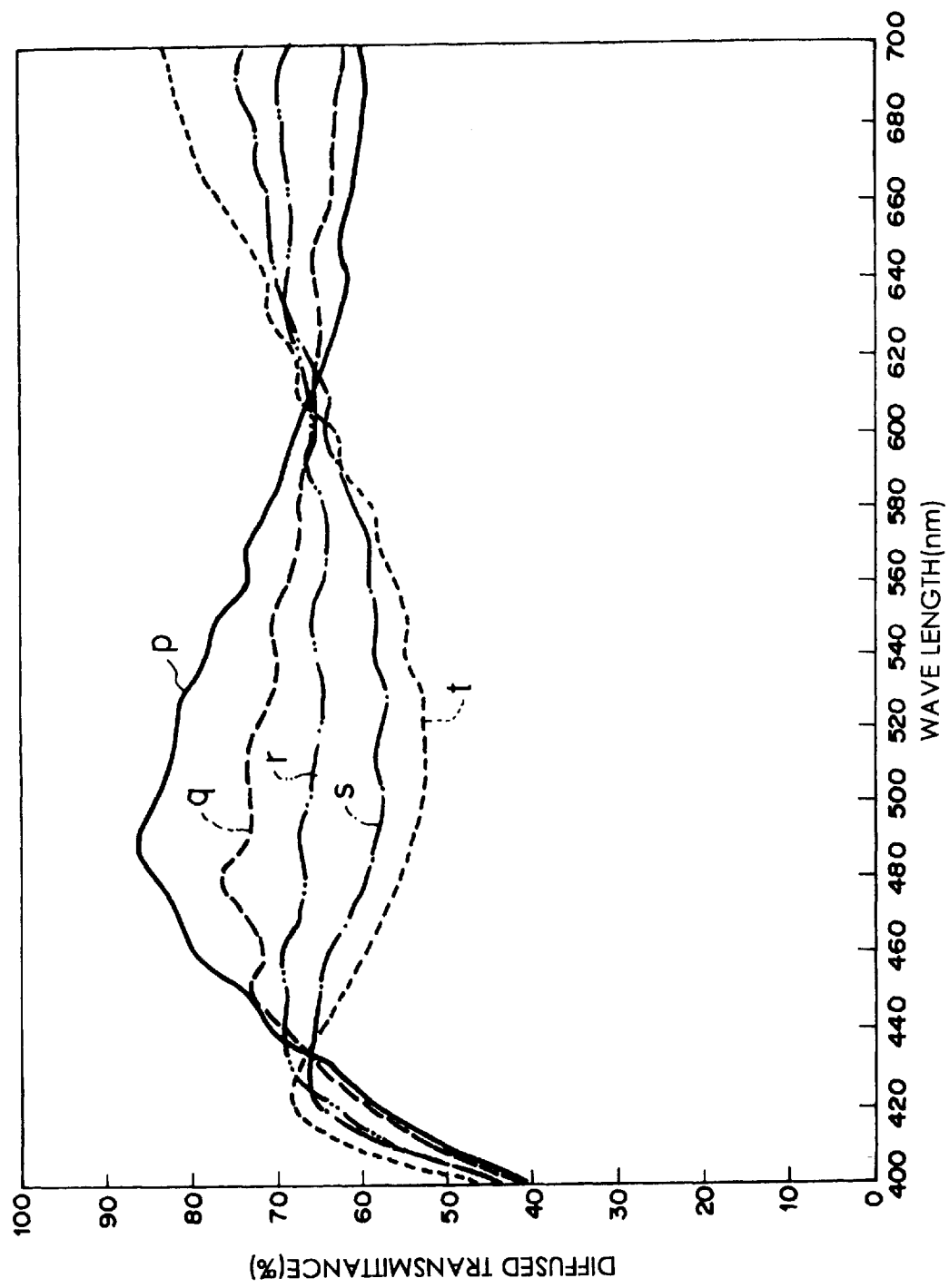
FIG. 17 is a comparative explanatory view of light reflectance spectrum in the case where the percentages of two titanium dioxide coated mica which were used in the semitransmissive diffusing film in accordance with one example of the present invention were variously changed.

In FIG. 17, a comparison result of light transmittance in the cases where the percentages of titanium dioxide coated mica G and H which were used in the semitransmissive diffusing film of this example 2-4 were variously changed is shown.

p, q, r, s, and t in FIG. 17 were the light transmittance in the cases where the percentages of titanium dioxide coated mica G and H were 100:0, 75:25, 50:50, 25:75, 0:100, respectively.

As a result, it is understood that the transmitted light in the semitransmissive diffusing film could be obtained with green interference color by titanium dioxide coated mica G as shown in p of FIG. 17 in the case where the percentage of titanium dioxide coated mica G and H was 100:0.

Also, it is understood that the transmitted light in the semitransmissive diffusing film could be obtained with red interference color by titanium dioxide coated mica H as shown in t of FIG. 17 in the case where the percentage of titanium dioxide coated mica G and H was 0:100.

To the contrary, in the case where the percentage of the titanium dioxide coated mica G and H was 50:50, it is understood that the transmitted light of the semitransmissive diffusing film could be obtained with white interference color which was favorably blended by green interference color of titanium dioxide coated mica G and red interference color of titanium dioxide coated mica G as shown in r of FIG. 17.

According to the semitransmissive diffusing film of this example 2-4, the transmitted light in the diffusing film could be obtained with much whiter interference color by using titanium dioxide coated mica G and H at the percentage of 50:50 in the case where white light was entered into the semitransmissive diffusing film, since green interference colors of titanium dioxide coated mica G and red interference color of titanium dioxide coated mica H were favorably blended.

Further, though the transmitted light in the transmissive diffusing film could be obtained with much whiter interference color in the case where titanium dioxide coated mica G and H were used at the percentages of 50:50 as stated above, the transmitted light in the semitransmissive diffusing film could be obtained with satisfactory and nearly white color tone in the cases where titanium dioxide coated mica G and H were used at the percentages of 25:75 to 75:25 as shown in q and s of FIG. 17.

EXAMPLE 2-5

In example 2-5, a substance which was uniformly dispersed titanium dioxide coated mica I and J (average particle diameter 10 μm to 60 μm, total 2.0 g) in 15 g of acrylic lacquer, was coated on PET film by a barcoater with 200 μm layer thickness with dry state.

In this example 2-5, the titanium dioxide coated mica I was determined as white titanium dioxide coated mica. Namely, the layer thickness of titanium dioxide was determined as 40 nm to 60 nm in titanium dioxide coated mica I.

To the contrary, the layer thickness of titanium dioxide was determined so as that the reflected light was obtained with yellow interference color in titanium dioxide coated mica J. Namely, the layer thickness of titanium dioxide was determined as 60 nm to 80 nm in titanium dioxide coated mica J.

Figure 18:
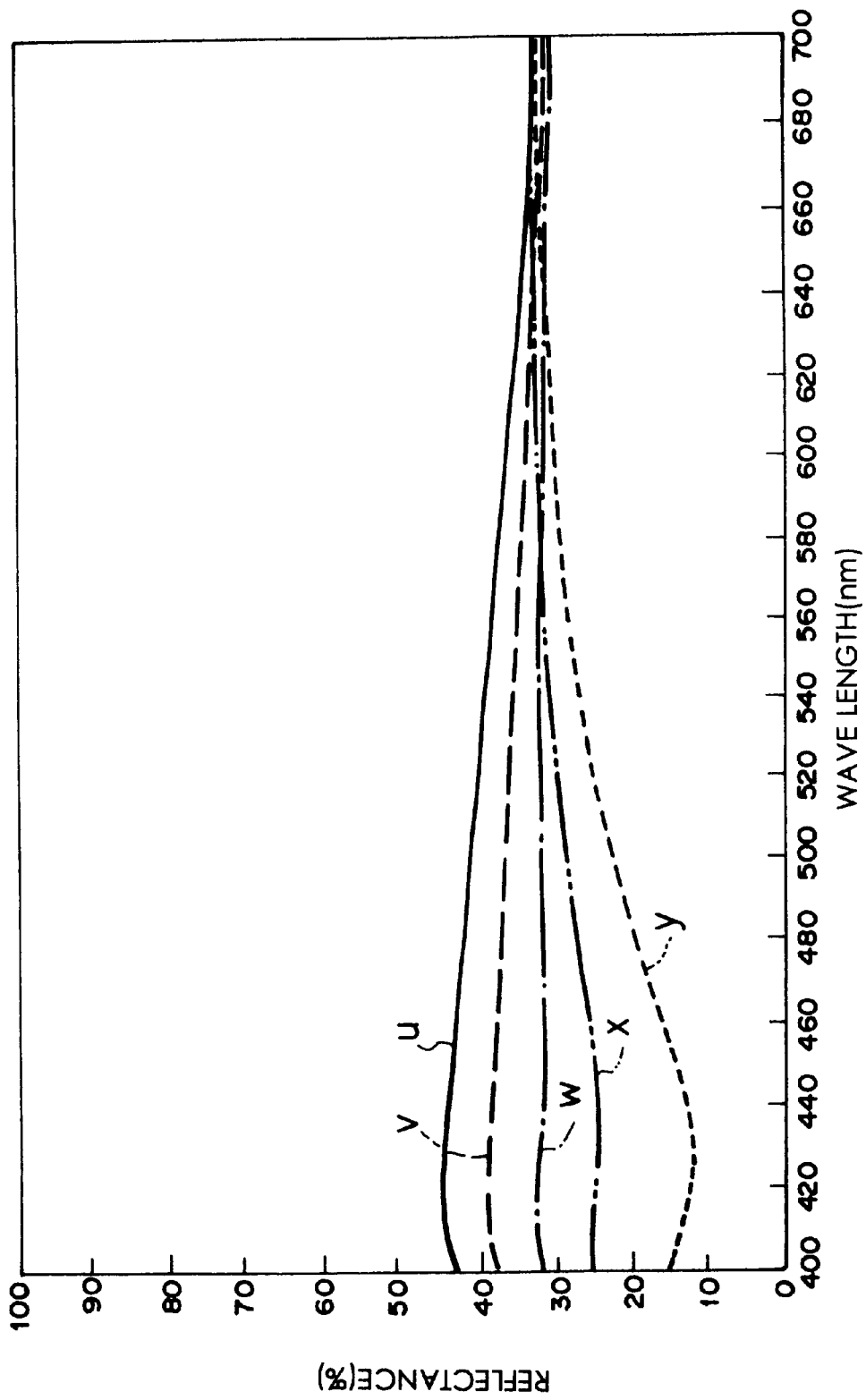
FIG. 18 is a comparative explanatory view of light transmittance spectrum in the case where the percentages of two titanium dioxide coated mica which were used in the semitransmissive diffusing film in accordance with one example of the present invention were variously changed.

In FIG. 18, a comparison result of light reflectance in the cases where the percentages of titanium dioxide coated mica I and J which were used in the semitransmissive diffusing film of this example 2-5 were variously changed is shown. These light reflectances are the light reflectance at the time (when the reflected light from the semitransmissive diffusing film) was vertically received in the condition of diffused lighting of white light.

u, v, w, x and y in FIG. 18 were the light reflectance in the case where the percentages of the titanium dioxide coated mica I and J were 100:0, 75:25, 50:50, 25:75, 0:100, respectively.

As a result, it is understood that the reflected light in the semitransmissive diffusing film could be obtained with liver brown of titanium dioxide coated mica I as shown in u of FIG. 18 in the case where the percentage of titanium dioxide coated mica I and J which were used in the semitransmissive diffusing film of this example 2-5 was 100:0.

Also, it is understood that the reflected light in the semitransmissive diffusing film could be obtained with yellow reflected color of titanium dioxide coated mica J as shown in y of FIG. 18 in the case where the percentage of titanium dioxide coated mica I and J was 0:100.

To the contrary, in the case where the percentage of titanium dioxide coated mica I and J was 50:50, it is understood that the reflected light in the semitransmissive diffusing film could be obtained with much whiter interference color which was favorably blended by liver brown interference color of titanium dioxide coated mica I and yellow interference color of titanium dioxide coated mica J as shown in w of FIG. 18.

According to the semitransmissive diffusing film of this example 2-5, the reflected light in the semitransmissive diffusing film could be obtained with much whiter interference color by using titanium dioxide coated mica I and J at the percentage of 50:50 as shown in w of FIG. 18, as compared with u and y which were shown the conventional examples, in the case where white light was entered to the reflective diffusing film, since liver brown interference color of titanium dioxide coated mica I and yellow interference color of titanium dioxide coated mica J were favorably blended.

Further, though the reflected light in the semitransmissive diffusing film could be obtained with much whiter interference color in the case where titanium dioxide coated mica I and J were used at the percentage of 50:50 as stated above, the reflected light in the semitransmissive diffusing film could be obtained with satisfactory and nearly white color tone in the case where titanium dioxide coated mica I and J were used at the percentages of 25:75 to 75:25 as shown in v and x of FIG. 18.

EXAMPLE 2-6

In example 2-6, a substance which was uniformly dispersed titanium dioxide coated mica K and L (average particle diameter 10 μm to 60 μm, total 2.0 g) in 15 g of acrylic lacquer, was coated on PET film by a barcoater with 200 μm layer thickness with dry state.

In this example 2-6, the layer thickness of titanium dioxide was determined so as that the reflected light was obtained with red interference color in titanium dioxide coated mica K. Namely, the layer thickness of titanium dioxide was determined as 80 nm to 100 nm in titanium dioxide coated mica K.

To the contrary, the layer thickness of titanium dioxide was determined so as that the reflected light was obtained with green interference color in titanium dioxide coated mica L. Namely, the layer thickness of titanium dioxide was determined as 140 nm to 160 nm in titanium dioxide coated mica L.

Figure 19:
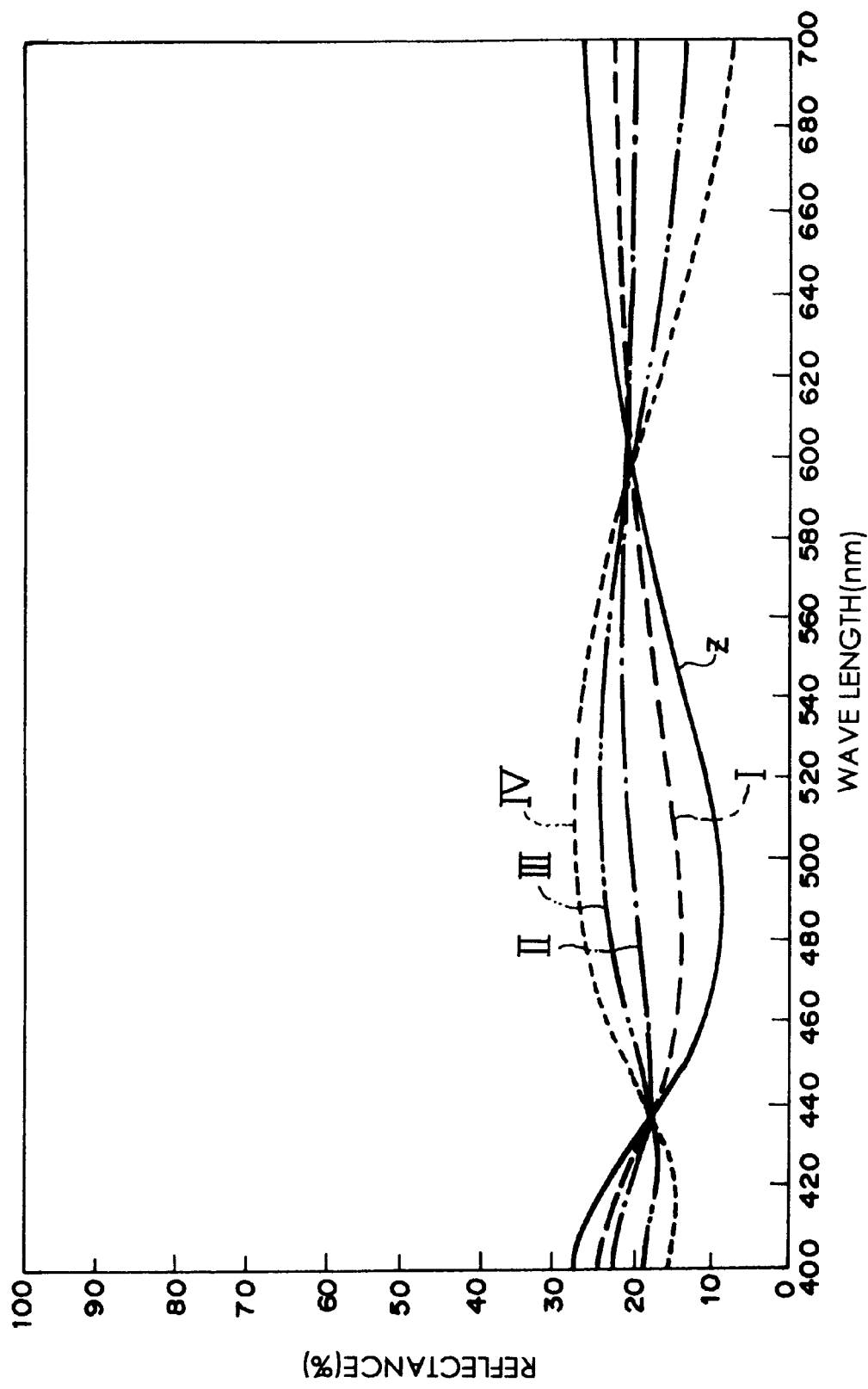
FIG. 19 is a comparative explanatory view of light reflectance spectrum in the case where the percentage of two titanium dioxide coated mica which were used in the semitransmissive diffusing film in accordance with one example of the present invention were variously changed.

In FIG. 19, a comparison result of light reflectance in the cases where the percentages of titanium dioxide coated mica K and L which were used in the semitransmissive diffusing film of this example 2-6 were variously changed is shown. These light reflectances are the light reflectance at the time (when the reflected light from the semitransmissive diffusing film) was vertically received in the condition of diffused lighting of white light.

z, I, II, III and IV in FIG. 19 were the light reflectance in the cases where the percentages of the titanium dioxide coated mica K and L were 100:0, 75:25, 50:50, 25:75, 0:100, respectively.

As a result, it is understood that the reflected light in the semitransmissive diffusing film could be obtained with red interference color of titanium dioxide coated mica K as shown in z of FIG. 19 in the case where the percentage of titanium dioxide coated mica K and L used in the semitransmissive diffusing film of this example 2-6 was 100:0.

Also, it is understood that the reflected light in the semitransmissive diffusing film could be obtained with green interference color of titanium dioxide coated mica L as shown in IV of FIG. 19 in the case where the percentage of titanium dioxide coated mica K and L was 0:100.

To the contrary, in the case where the percentage of titanium dioxide coated mica K and L was 50:50, it is understood that the reflected light in the semitransmissive diffusing film could be obtained with much whiter interference color as a whole, which was favorably blended by red interference color of titanium dioxide coated mica K and green interference color of titanium dioxide coated mica L as shown in II of FIG. 19.

According to the semitransmissive diffusing film of this example 2-6, the reflected light in the semitransmissive diffusing film could be obtained with much whiter interference color by using titanium dioxide coated mica K and L at the percentage of 50:50 as shown in II in FIG. 19, as compared with z and IV which shows the conventional examples, in the case where white light was entered into the reflective diffusing film, since red interference color of titanium dioxide coated mica K and green interference color of the titanium dioxide coated mica L were favorably blended.

Further, though the reflected light in the semitransmissive diffusing film could be obtained with much whiter interference color in the case where titanium dioxide coated mica K and L were used at the percentage of 50:50 as stated above, the reflected light in the semitransmissive diffusing film could be obtained with satisfactory and nearly white color tone in the case where titanium dioxide coated mica K and L were used at the percentages of 25:75 to 75:25 as shown in I and III of FIG. 19.

EXAMPLE 2-7

Two blue pearly pigment that displays purple interference color and has different particle diameter in each other, were added to acrylic resin lacquer. Then, the mixture which was dispersed and mixed by a homogenizer and was printed on polyethylene terephthalate (PET) so as that thickness could be 50 μm by screen printing method. A semitransmissive diffusing film was manufactured by heating and hardening it at 60° C. The obtained semitransmissive diffusing film was stuck to the reverse side of a normally white mode TN-type liquid crystal display element (installed so as to cross the polarizing film each other) in the state that said pearly pigment layer was set to the top. A semitransmissive liquid crystal display element was manufactured by fitting a back lighting unit which was composed of white cold-cathode tube and aluminum reflective film, under the semitransmissive diffusing film. According to the obtained semitransmissive liquid crystal display element, the design which displays the different color tone according to ON and OFF of the back lighting was revealed. For example, display portion black-non display portion blue, in the case where the back lighting was switched ON and display portion black-non display portion purple, in the case where the back lighting was switched OFF.

As explained above, according to the semitransmissive diffusing film of the present invention, said semitransmissive diffusing film comprises two or more of powder which has an interference color. Namely, the transmitted light or the reflected light at the semitransmissive diffusing film was obtained with the interference color of the desired color tone as a whole, by properly changing the kinds or percentages of these powders and by blending the interference colors of these powders.

Therefore, the semitransmissive diffusing film of the present invention has high using efficiency of the light in comparison with the semitransmissive diffusing film which is obtained its color tone by absorbing the optical component of the specific wavelength to color pigment or pigment as in conventional. Accordingly, vivid color tone can be obtained in stable.

Also, the transmitted light or the reflected light of the semitransmissive diffusing film can be obtained with the interference color of the desired color tone by changing properly the kinds and the percentages of these powders. Further, the favorable toning of the color tone is facilitated.

Further, the more beautiful color tone can be obtained by using titanium dioxide coated synthetic mica which is coated titanium dioxide on the surface of synthetic mica, because the powders used synthetic mica has much less impurities in comparison with the powders used natural mica.

Reflective Diffusing Film

According to the reflective film in accordance with the present invention, the reflective film is preferably comprising two or more of the powder which has an interference color as stated above. Namely the reflected light at the reflective diffusing film was obtained with the interference color of the desired color tone as a whole by properly changing the kinds or the percentages of these powders and by blending the interference color of these powders.

Therefore, the reflective diffusing film of the present invention had high using efficiency of the light in comparison with the reflective diffusing film which was obtained its color tone by absorbing the optical component of the specific wavelength to color pigment or pigment as in conventional. Accordingly, vivid color tone can be obtained in stable.

Also, the reflected light at the reflective diffusing film can be obtained with the interference color of the desired color tone by suitably changing the kinds and the percentages of these powders. Further, the favorable toning of the color tone is facilitated.

In said reflective diffusing film, the powder that the interference color is in a complementary relation can be obtained the reflected light in the reflective diffusing film with satisfactory white interference color in the case where 25% to 75% of one powder is added to the other powder.

Also, in said reflective diffusing film, in the case where said powder is set on the substrate, it is preferable that an amount of said powder on the substrate is 0.01 g/m$^2$ to 100 g/m$^2$. Namely, it becomes difficult to obtain the reflected light at the reflective diffusing film with the desired color tone in the case where the amount of said powder on the substrate is less than 0.01 g/m$^2$.

To the contrary, in the case where said powder is set in the substrate, it is preferable that an amount of said powder is 1 wt % to 70 wt % in the substrate. Namely, it becomes difficult to obtain the light reflectance of the reflective diffusing film in favorable in the case where the amount of said powder in the substrate is less than 1 wt %. On the other hand, strength of the reflective diffusing film is extremely deteriorated in the case where the amount of said powder in the substrate is 70 wt % or more.

Also, it is preferable that the reflective diffusing film of the present invention which can obtain the reflected light with white interference color is used in a reflective liquid crystal display element of black-and-white display. Namely, it is possible to obtain brightness, visibility, high contrast and wide viewing angle by using the reflective diffusing film.

It is also preferable that the reflective diffusing film of the present invention which can obtain the reflected light with the colored interference color of the desired color is used in a reflective liquid crystal display element of two-color display. Namely it is possible to obtain design, brightness, visibility, high contrast and wide viewing angle by using the reflective diffusing film without using such as a color filter.

Further, it is also preferable that the reflective diffusing film of the present invention which can obtain the reflected light with white interference color is used in a reflective liquid crystal display element of color display. Namely, it is possible to obtain high reproducibility of color in the color filter, brightness, visibility, high contrast, and wide viewing angle, by using the reflective diffusing film, because, for example, the incident light from the reflective diffusing film to the color filter can be obtained with much whiter color tone.

Also, a reflective diffusing film in accordance with the present embodiment can be manufactured by incorporating these powders in a substrate (nitrocellulose, acrylic polymer, polycarbonate, polyester, polyurethane, polyethylene terephthalate (PET) and the like).

A reflective diffusing film can be manufactured by printing or coating the powder on the substrate as an ink.

As for the ink which prepared with said powder, the ink which was dispersed and mixed said powder into a resin binder such as polyacryl, polyurethane, polycarbonate, polyester and the like can be used.

Also, as for the coating methods, screen printing method, roll coater, offset printing method, knife coater, comma coater, and the like can be listed as an example.

Also, as for the substrate, transparent, semitransparent and white plastic sheet (thickness about 10 μm to 1000 μm), and the like can be used. For example, polyolefines such as polyvinyl chloride, polyethylene, polypropylene, and the like, polyesters such as polyethylene terephthalate and the like, resins such as polystyrene, polycarbonate, acrylic resin, polyurethane resin and the like can be used. Also, it is possible to add 20 wt % to 100 wt % of a plasticizer to the resin as occasion demands. It is also possible to use metallic plates or deposited films such as silver.

Also, surface finishing such as embossing finish and the like can be conducted, as occasion demands.

Further, 1 wt % to 50 wt % of white pigment, transparent particle, plastic bead, and the like can be added with respect to the powder for the purpose of toning the color tone of the reflected light at the reflective diffusing film.

As for the white pigment, titanium dioxide coated mica which has not interference color, barium sulfate, titanium dioxide, zinc oxide, magnesium oxide, titanium dioxide, transparent particle, silica particle, plastic bead, acryl, nylon, polystyrene, polysilicone and the like can be listed as an example.

Also, it is preferable that a particle diameters of these powders are 0.1 $\mu$m to 200 $\mu$m.

Further, the more beautiful color tone can be obtained by using titanium dioxide coated synthetic mica which is coated titanium dioxide on the surface of synthetic mica as the powder which has characteristic interference color in the present invention, because the powders used synthetic mica has much less impurities in comparison with the powders used natural mica.

As stated above, according to a reflective liquid crystal display element 22 in accordance with the embodiment of the present invention, titanium dioxide coated mica 14a and 14b that each interference color is in a complementary relation, are used in the substrate 17 so as that the reflected light at the reflective diffusing film can be obtained with white interference color.

Therefore, the reflective diffusing film of the present invention had high using efficiency of the light in comparison with the reflective diffusing film which was obtained its color tone by absorbing the optical component of the specific wavelength to color pigment or pigment as in conventional. Accordingly, vivid color tone can be obtained in stable.

Also, the reflected light at the reflective diffusing film 28 can be obtained with white interference color as a whole, by properly changing the layer thickness and the percentages of titanium dioxide in titanium dioxide coated mica 14a and 14b and by favorably blending the interference color of these titanium dioxide coated mica 14a and 14b.

Also, the reflective diffusing film and the reflective liquid crystal display element using the same in accordance with the present invention are not limited to these constitutions, and various formations can be adopted within the range of the essentials of the invention.

Also, in the case where said titanium dioxide coated mica 14a and 14b are set on the substrate which have light reflectance, the reflected light at the reflective diffusing film can be obtained with the desired color tone by determining the amounts of said powder on the substrate as 0.01 g/m$^2$ to 100 g/m$^2$.

To the contrary, in the case where said titanium dioxide coated mica 14a and 14b are set in the substrate which does not have light reflectance, the light reflectance of the reflective diffusing film can be obtained in favorable and satisfactory intensity of the reflective diffusing film can be obtained in the case where the amounts of said titanium dioxide coated mica 14a and 14b on the substrate was 1 wt % to 70 wt %.

Also, brightness, visibility, high contrast and wide viewing angle can be obtained by using the reflective diffusing film in accordance with the present invention that the reflected light can be obtained with white interference color in the reflective liquid crystal display element of black-and-white display.

Further, design, brightness, visibility, high contrast, and wide viewing angle can be obtained by using the reflective diffusing film in accordance with the present invention that the reflected light can be obtained with the colored interference color of the desired color tone, in the reflective liquid crystal display element of two-color display, because, for example, the colored color tone can be obtained without using the color filter.

Also, high reproducibility of color in the color filter, brightness, visibility, high contrast, and wide viewing angle can be obtained by using the reflective diffusing film in accordance with the present invention that the reflected light can be obtained with white interference color in the reflective liquid crystal display element of color display, because, for example, the internal light from the reflective diffusing film to the color filter can be obtained with much whiter color tone.

Further, the more beautiful color tone can be obtained in the case where titanium dioxide coated synthetic mica which is coated titanium dioxide on the surface of synthetic mica as these titanium dioxide coated mica 14a and 14b, since the titanium dioxide coated synthetic mica has much less impurities as compared with a titanium dioxide coated mica which is used natural mica.

Also, the concrete manufacturing process of the reflective liquid crystal display element in accordance with the present embodiment will be shown in the following manufacturing process 3-1.

Manufacturing Process 3-1

First, the powder in accordance with the present invention was added to acrylic resin lacquer. Then, the mixture which was dispersed and mixed by a homogenizer was printed on polyethylene terephthalate (PET) so as that thickness could be 50 $\mu$m by screen printing method. A reflective diffusing film was manufactured by heating and hardening it at 60° C.

A reflective liquid crystal display element was manufactured by sticking the obtained reflective diffusing film to the reverse side of a normally white mode TN-type liquid crystal display element (installed so as to cross the polarizing film each other) in the state that said powder layer was set to the top.

In the following the preferable examples of the present invention will be explained. However, the present invention is not limited to these examples.

EXAMPLE 3-1

In example 3-1, a substance which dispersed titanium dioxide coated mica A and B whose interference colors are complementary to each other (average particle diameter 10 $\mu$m to 60 $\mu$m, total 2.0 g) in 15 g of acrylic lacquer with 50:50, was coated on PET film by a barcoater with the layer thickness 200 $\mu$m with dry state.

In this example 3-1, the layer thickness of titanium dioxide which was coated on the surface of mica was determined as about 40 nm to 60 nm in titanium dioxide coated mica A and the layer thickness of titanium dioxide which was coated on the surface of mica was determined as about 60 nm to 80 nm in titanium dioxide coated mica B.

Figure 20:
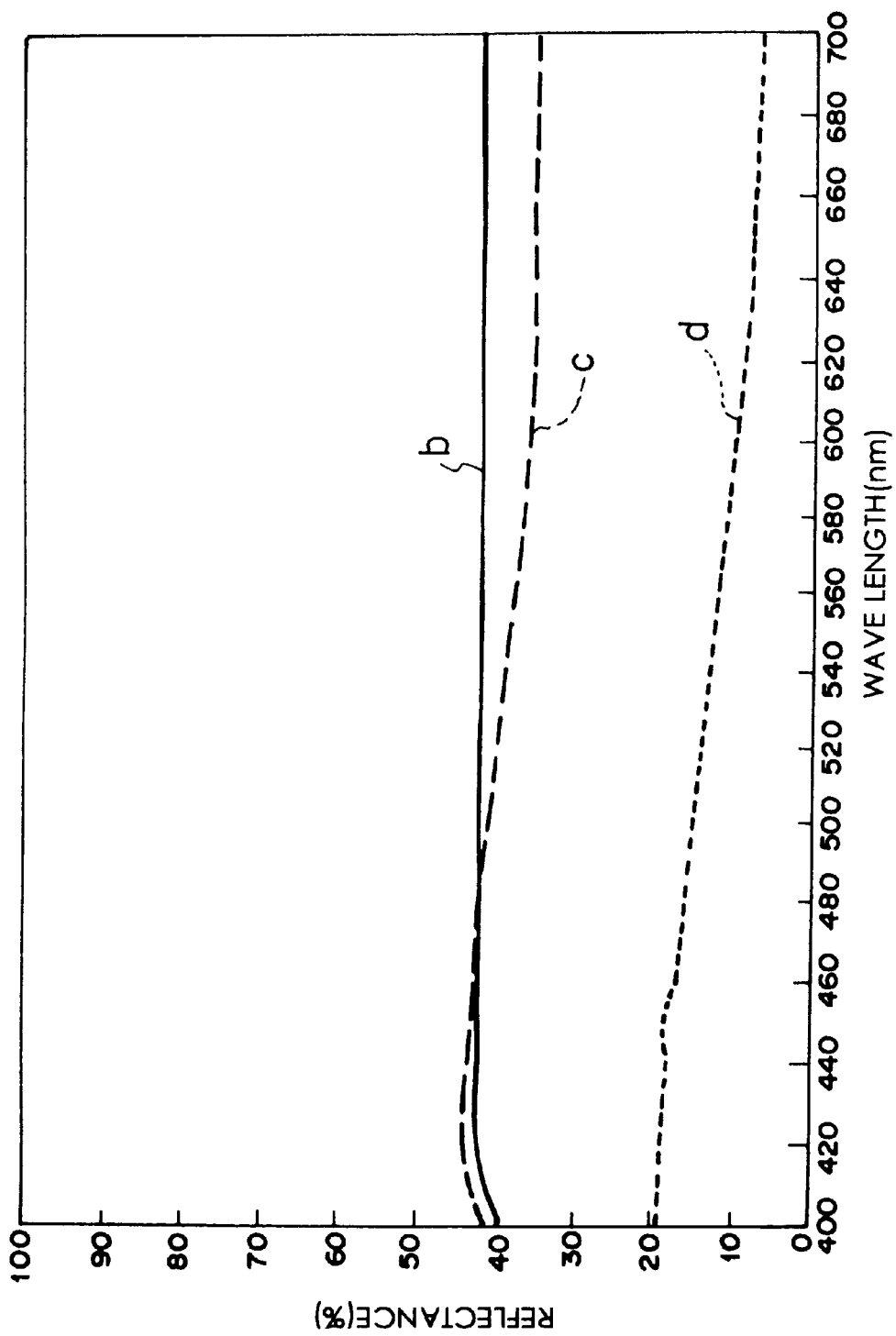
FIG. 20 is a comparative explanatory view of light reflectance spectrum in the cases where the reflective diffusing film in accordance with one example of the present invention and the conventional reflective film were used.

In FIG. 20, a comparison result of light reflectances between the cases that the reflective diffusing film of this example 3-1 and the conventional reflective diffusing film were used is shown. These light reflectances are the light reflectance at the time (when the reflected light from the reflective diffusing film) was vertically received in the condition of diffused lighting of white light.

b, c and d in FIG. 20 are the light reflectance of the reflective diffusing film in accordance with this example 3-1, the reflective diffusing film which comprised one of general pearly pigment in conventional and the conventional silver deposited film which has metallic luster, respectively.

As a result, it is understood that light reflectance was almost flat in the range of 400 nm to 700 nm in the case where b in FIG. 20 which shows this example 3-1 was compared with c and d in FIG. 20 which shows the conventional example. In particular, it is also understood that light reflectance was largely improved in the case where b in FIG. 20 which shows this example 3-1 was compared with d in FIG. 20 which shows the conventional example.

Namely, according to the reflective diffusing film of this example 3-1, it is possible to obtain the reflected light at the reflected diffusing film with the much desired color.

EXAMPLE 3-2

In example 3-2, a substance which was uniformly dispersed titanium dioxide coated mica C and D (average particle diameter 10 μm to 60 μm, total 2.0 g) in 15 g of acrylic lacquer, was coated on PET film by a barcoater with 200 μm layer thickness with dry state.

In this example 3-2, titanium dioxide coated mica C was determined as white titanium dioxide coated mica. Namely, the layer thickness of titanium dioxide was determined as 40 nm to 60 nm in titanium dioxide coated mica C.

To the contrary, in titanium dioxide coated mica D, the layer thickness of titanium dioxide was considered so as that the reflected light could be obtained with yellow interference color. Namely, the layer thickness of titanium dioxide was determined as 60 nm to 80 nm in titanium dioxide coated mica D.

Figure 21:
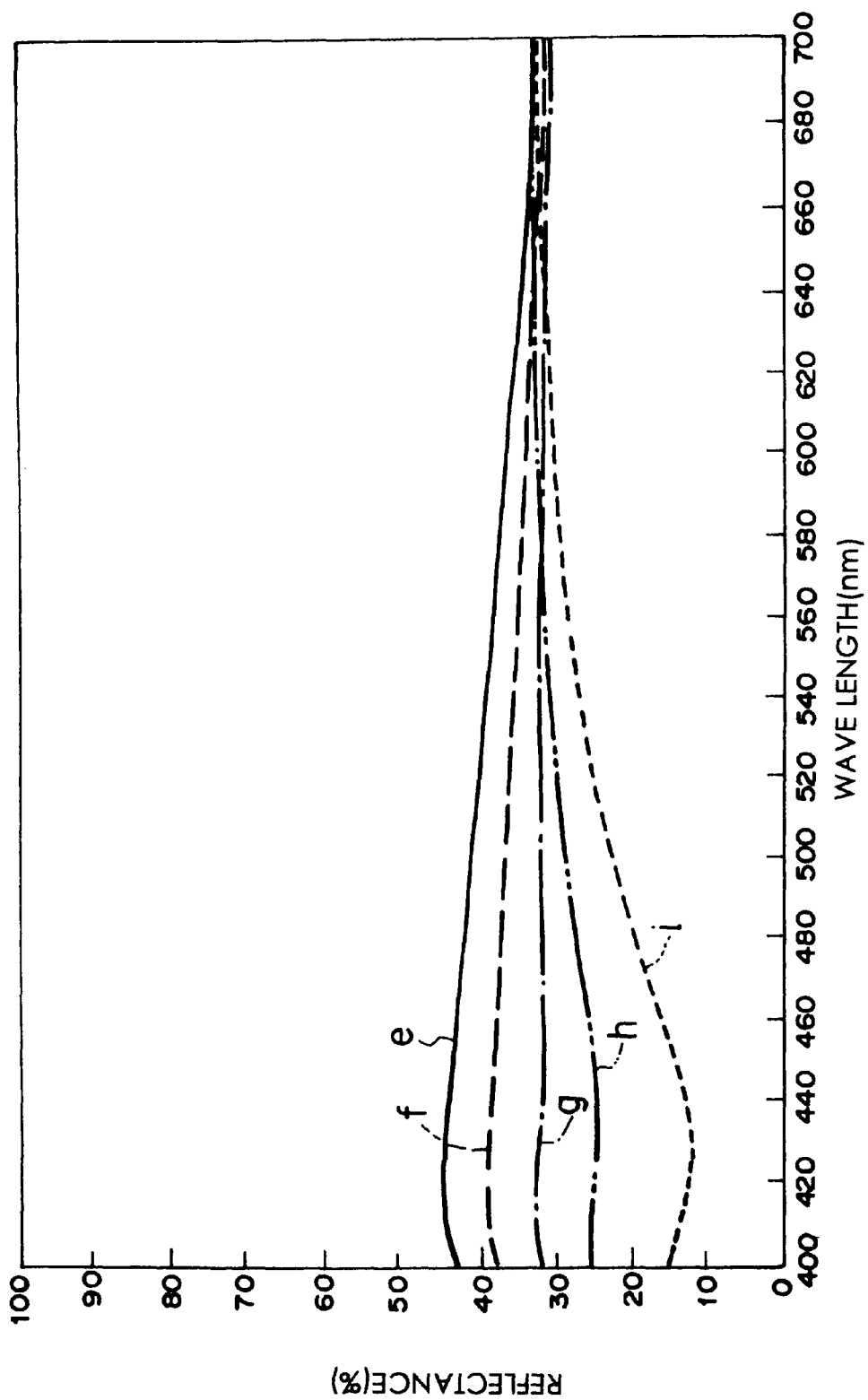
FIG. 21 is a comparative explanatory view of light reflectance spectrum in the case where the percentages of two titanium dioxide coated mica which were used in the reflective diffusing film in accordance with one example of the present invention were variously changed.

In FIG. 21, a comparison result of light reflectance in the cases where the percentages of titanium dioxide coated mica C and D which were used in the reflective diffusing film of this example 3-2 were variously changed is shown. These light reflectances are the light reflectance at the time (when the reflected light from the reflective diffusing film) was vertically received in the condition of diffused lighting of white light.

e, f, g, h and i in FIG. 21 are the light reflectance in the cases where the percentages of titanium dioxide coated mica C and D were 100:0, 75:25, 50:50, 25:75, 0:100, respectively.

As a result, it is understood that the reflected light in the reflective diffusing film could be obtained with liver brown of titanium dioxide coated mica C as shown in e of FIG. 21 in the case where the percentage of titanium dioxide coated mica C and D used in the reflective diffusing film in accordance with this example 3-2 was 100:0.

Also, it is understood that the reflected light in the reflective diffusing film could be obtained with yellow interference color of titanium dioxide coated mica D as shown in i of FIG. 21 in the case where the percentage of titanium dioxide coated mica C and D was 0:100.

To the contrary, in the case where the percentage of titanium dioxide coated mica C and D was 50:50, it is understood that the reflected light in the reflective diffusing film could be obtained with white interference color as a whole which was favorably blended by liver brown interference color of titanium dioxide coated mica C and yellow interference color of titanium dioxide coated mica D as shown in g of FIG. 21.

According to the reflective diffusing film in accordance with this example 3-2, the reflected light in the reflective diffusing film could be obtained with much whiter interference color by using titanium dioxide coated mica C and D at the percentage of 50:50 in the case where white light was entered to the reflective diffusing film, because liver brown interference color of titanium dioxide coated mica C and yellow interference color of titanium dioxide coated mica D were favorably blended.

Also, though the reflected light in the reflective diffusing film could be obtained with much whiter interference color in the case where titanium dioxide coated mica C and D were used at the percentage of 50:50 as stated above, the reflected light in the reflective diffusing film could be obtained with satisfactory and nearly white color tone in the case where titanium dioxide coated mica C and D were used at the percentages of 25:75 to 75:25 as shown in f and h in FIG. 21.

EXAMPLE 3-3

In example 3-3, a substance which was uniformly dispersed titanium dioxide coated mica E and F (average particle diameter 10 μm to 60 μm, total 2.0 g) in 15 g of acrylic lacquer, was coated on PET film by a barcoater with 200 μm layer thickness with dry state.

In this example 3-3, the layer thickness of titanium dioxide was considered so as that the reflected light could be obtained with red interference color in titanium dioxide coated mica E. Namely, the layer thickness of titanium dioxide was determined as 80 nm to 100 nm in titanium dioxide coated mica E.

To the contrary, the layer thickness of titanium dioxide was considered so as that the reflected light could be obtained with green interference color in titanium dioxide coated mica F. Namely, the layer thickness of titanium dioxide was determined as 140 nm to 160 nm in titanium dioxide coated mica F.

Figure 22:
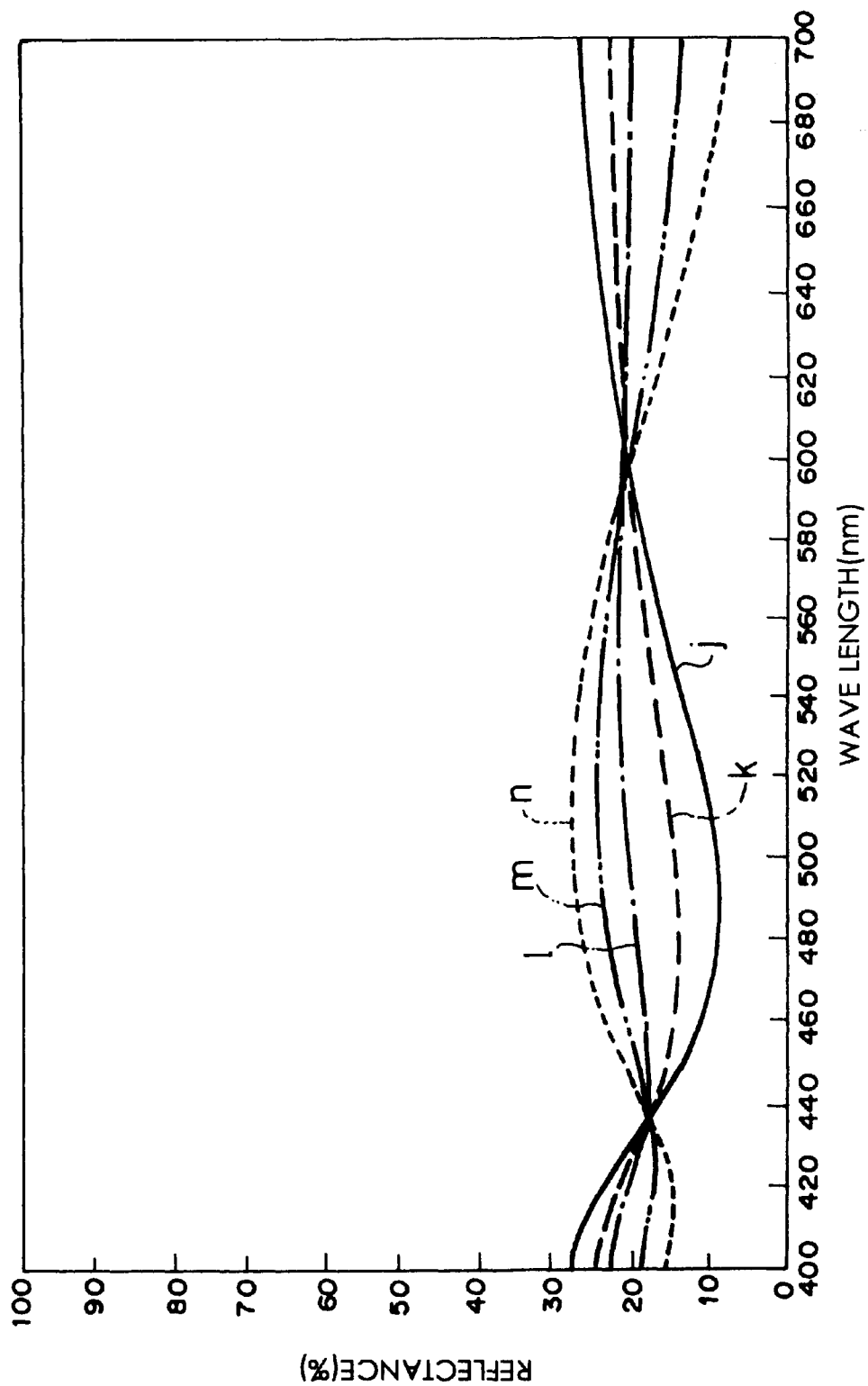
FIG. 22 is a comparative explanatory view of light reflectance spectrum in the case where the percentages of two titanium dioxide coated mica which were used in the reflective diffusing film in accordance with one example of the present invention were variously changed.

In FIG. 22, a comparison result of light reflectance in the case where the percentages of titanium dioxide coated mica E and F which were used in the reflective diffusing film of this example 3-3 were variously changed is shown. These light reflectances are the light reflectance at the time (when the reflected light from the reflective diffusing film) was vertically received in the condition of diffused lighting of white light.

j, k, l, m and n in FIG. 22 were the light reflectance in the cases where the percentages of titanium dioxide coated mica E and F were 100:0, 75:25, 50:50, 25:75, 0:100, respectively.

As a result, it is understood that the reflected light in the reflective diffusing film could be obtained with red interference color of titanium dioxide coated mica E as shown in j in FIG. 22 in the case where the percentage of titanium dioxide coated mica E and F used in the reflective diffusing film in accordance with this example 3-3 was 100:0.

Also, it is understood that the reflected light in the reflective diffusing film could be obtained with green interference color of titanium dioxide coated mica F as shown in n of FIG. 22 in the case where the percentage of titanium dioxide coated mica E and F was 0:100.

To the contrary, in the case where the percentage of titanium dioxide coated mica E and F was 50:50, it is understood that the reflected light in the reflective diffusing film could be obtained with white interference color as a whole which was favorably blended by red interference color of titanium dioxide coated mica E and green interference color of titanium dioxide coated mica F as shown in l of FIG. 22.

According to the reflective diffusing film of this example 3-3, the reflected light in the reflective diffusing film could be obtained with much whiter interference color by using titanium dioxide coated mica E and F at the percentage of 50:50 in the case where white light was entered into the reflective diffusing film, because red interference color of titanium dioxide coated mica E and green interference color of titanium dioxide coated mica F were favorably blended.

Also, though the reflected light in the reflective diffusing film could be obtained with much whiter interference color in the case where titanium dioxide coated mica E and F were used at the percentage of 50:50 as stated above, the reflected light in the reflective diffusing film could be obtained with satisfactory and nearly white color tone in the cases where titanium dioxide E and F were used at the percentages of 25:75 to 75:25 as shown in k and m of FIG. 22.

As explained above, according to the reflective diffusing film of the present invention, the reflective diffusing film comprises two or more of the powder which has an interference color. Namely, the reflected light at the reflective diffusing film can be obtained with the interference color of the desired color tone as a whole, by properly changing the kinds or the percentages of these powders and by blending the interference color of these powders.

Therefore, the reflective diffusing film of the present invention had high using efficiency of the light in comparison with the reflective diffusing film which was obtained its color tone by absorbing the optical component of the specific wavelength to color pigment or pigment as in conventional. Accordingly, vivid color tone can be obtained in stable.

Also, the reflected light of the reflective diffusing film can be obtained with the interference color of the desired color tone by changing properly the kinds and the percentages of these powders. Further, the favorable toning of the color tone is facilitated.

Further, the more beautiful color tone can be obtained by using titanium dioxide coated synthetic mica which is coated titanium dioxide on the surface of synthetic mica, because titanium dioxide coated synthetic mica has much less impurities in comparison with titanium dioxide coated mica which used natural mica.

Also, brightness, visibility, high contrast and wide viewing angle can be obtained by using the reflective diffusing film in accordance with the present invention that the reflected light is obtained with white interference color in the reflective liquid crystal display element of black-and-white display.

Further, design, brightness, visibility, high contrast, and wide viewing angle can be obtained by using the reflective diffusing film in accordance with the present invention that the reflected light is obtained with the colored interference color of the desired color tone, in the reflective liquid crystal display element of two-color display, because, for example, the colored color tone can be obtained without using the color filter.

Also, high reproducibility of color, brightness, visibility, high contrast, and wide viewing angle can be obtained by using the reflective diffusing film in accordance with the present invention that the reflected light is obtained with white interference color for the reflective liquid crystal display element of color display, because, for example, the internal light from the reflective diffusing film to the color filter can be obtained with much whiter color tone.

What is claimed is:

1. A diffusing film comprising two or more of a powder which have an interference color complementary to each other,
   wherein an amount of said powder is 0.01 $g/m^2$ to 100 $g/m^2$ in the case where said powder is set on a substrate.

2. A diffusing film as in claim 1, wherein said powder is a pearly pigment.

3. A diffusing film according to claim 1, wherein said powder is a titanium oxide coated powder which coated titanium dioxide on the surface of mica, and a layer thickness of titanium dioxide which is coated on mica is the layer thickness that the interference color which is the same wave range with the absorption wave range can be obtained.

4. A diffusing film according to claim 1, wherein an amount of said powder is 1 wt % to 70 wt % in the case where said powder is set in the substrate.

5. A diffusing film comprising two or more of a powder which have an interference color complementary to each other, wherein a powder that has the interference color which is in a complementary relation with the other powder, was added 10% to 90% with respect to the other powder, so as that a transmitted light at said diffusing film can be obtained with white light;
   wherein an amount of said powder is 0.01 $g/m_2$ to 100 $g/m^2$ in the case where said powder is set on a substrate.

6. A diffusing film as in claim 5, wherein said powder is a pearly pigment.

7. A diffusing film according to claim 5, wherein said powder is a titanium oxide coated powder which coated titanium dioxide on the surface of mica, and a layer thickness of titanium dioxide which is coated on mica is the layer thickness that the interference color which is the same wave range with the absorption wave range can be obtained.

8. A diffusing film according to claim 5, wherein an amount of said powder is 1 wt % to 70 wt % in the case where said powder is set in the substrate.

9. A liquid crystal display element comprising:
   a light source which irradiates a light flux;
   a diffusing film which comprises two or more of a powder which have an interference color which are complementary to each other,
   wherein an amount of said powder is 0.01 $g/m_2$ to 100 $g/m^2$ in the case where said powder is set on a substrate; and
   a liquid crystal panel which controls light transmittance of the light flux from said diffusing film by changing a voltage which applies onto a liquid crystal layer.

10. A diffusing film as in claim 9, wherein said powder is a pearly pigment.

11. A diffusing film according to claim 9, wherein said powder is a titanium oxide coated powder which coated titanium dioxide on the surface of mica, and a layer thickness of titanium dioxide which is coated on mica is the layer thickness that the interference color which is the same wave range with the absorption wave range can be obtained.

12. A diffusing film according to claim 9, wherein an amount of said powder is 1 wt % to 70 wt % in the case where said powder is set in the substrate.

* * * * *